(12) United States Patent
Ueda et al.

(10) Patent No.: US 7,245,665 B2
(45) Date of Patent: Jul. 17, 2007

(54) WIRELESS REMOTE OPERATION SYSTEM

(75) Inventors: Dai Ueda, Osaka (JP); Hisashi Taniguchi, Osaka (JP); Naoki Nakajima, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 768 days.

(21) Appl. No.: 10/446,403

(22) Filed: May 28, 2003

(65) Prior Publication Data

US 2004/0036812 A1 Feb. 26, 2004

(30) Foreign Application Priority Data

May 30, 2002 (JP) .............................. 2002-156886

(51) Int. Cl.
*H04N 7/12* (2006.01)
*G06F 15/16* (2006.01)

(52) U.S. Cl. .................. 375/240.28; 725/43; 709/203; 382/236; 375/240.11

(58) Field of Classification Search .......... 375/240.28; 709/247; 725/41, 43, 48, 49, 81, 83
See application file for complete search history.

(56) References Cited

U.S. PATENT DOCUMENTS

| 5,043,919 | A  | * | 8/1991 | Callaway et al. ............ 715/733 |
| 6,654,421 | B2 | * | 11/2003 | Hanamura et al. ..... 375/240.26 |
| 7,028,025 | B2 | * | 4/2006 | Collins .......................... 707/3 |
| 2003/0093568 | A1 | * | 5/2003 | Deshpande ................. 709/247 |
| 2003/0120747 | A1 | * | 6/2003 | Kim ........................... 709/217 |

* cited by examiner

*Primary Examiner*—Gims Philippe
*Assistant Examiner*—Erick Rekstad
(74) *Attorney, Agent, or Firm*—RatnerPrestia

(57) ABSTRACT

A remote operation system includes a server and a client. In the server, a video-audio data conversion-into-common-format section converts data in a format unique to application software into data in a common format. A video-audio distributing section outputs audio-accompanying video data and moving-picture area data from the data in the common format. A section, which processes the transmission of the data of audio-accompanying moving-picture, adds a synchronizing data to video data and audio data, thereby obtaining a data stream. A video-audio data converting section outputs data including the moving-picture area data, operation-related audio display data. A remote control section outputs this data and the data stream. The client controls the application software of the server in response to an operation related to the video and the audio obtained from those data.

16 Claims, 18 Drawing Sheets

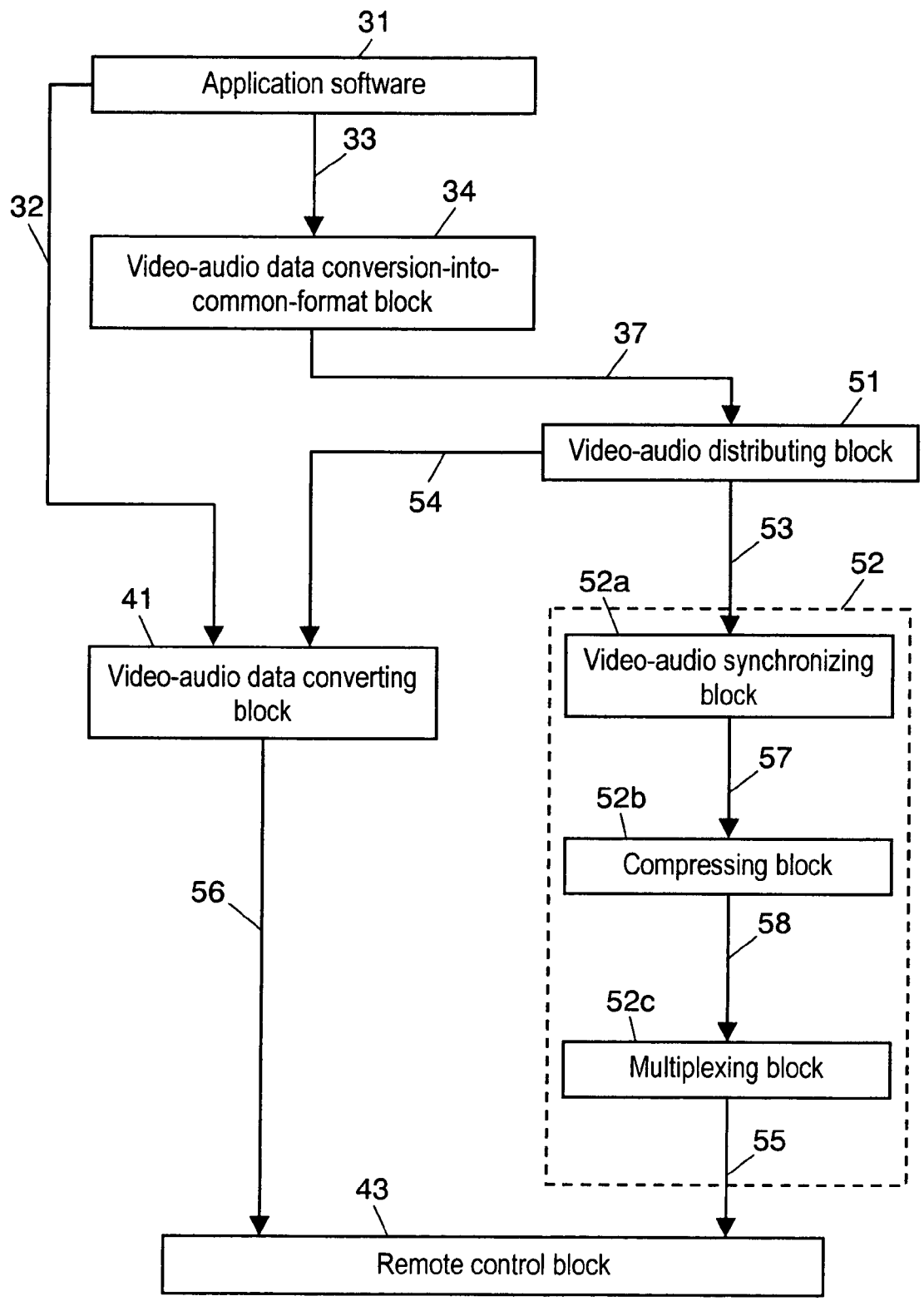

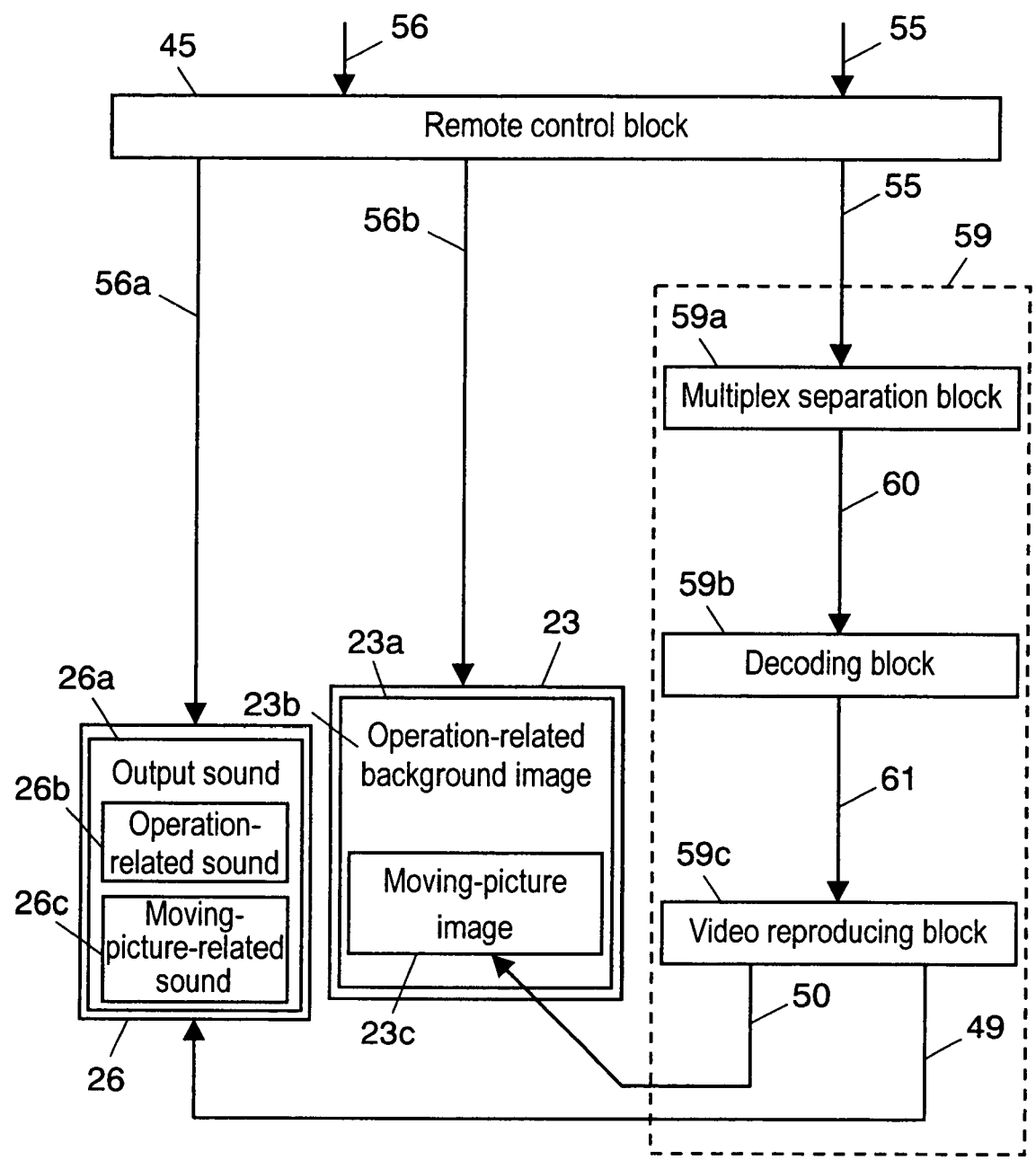

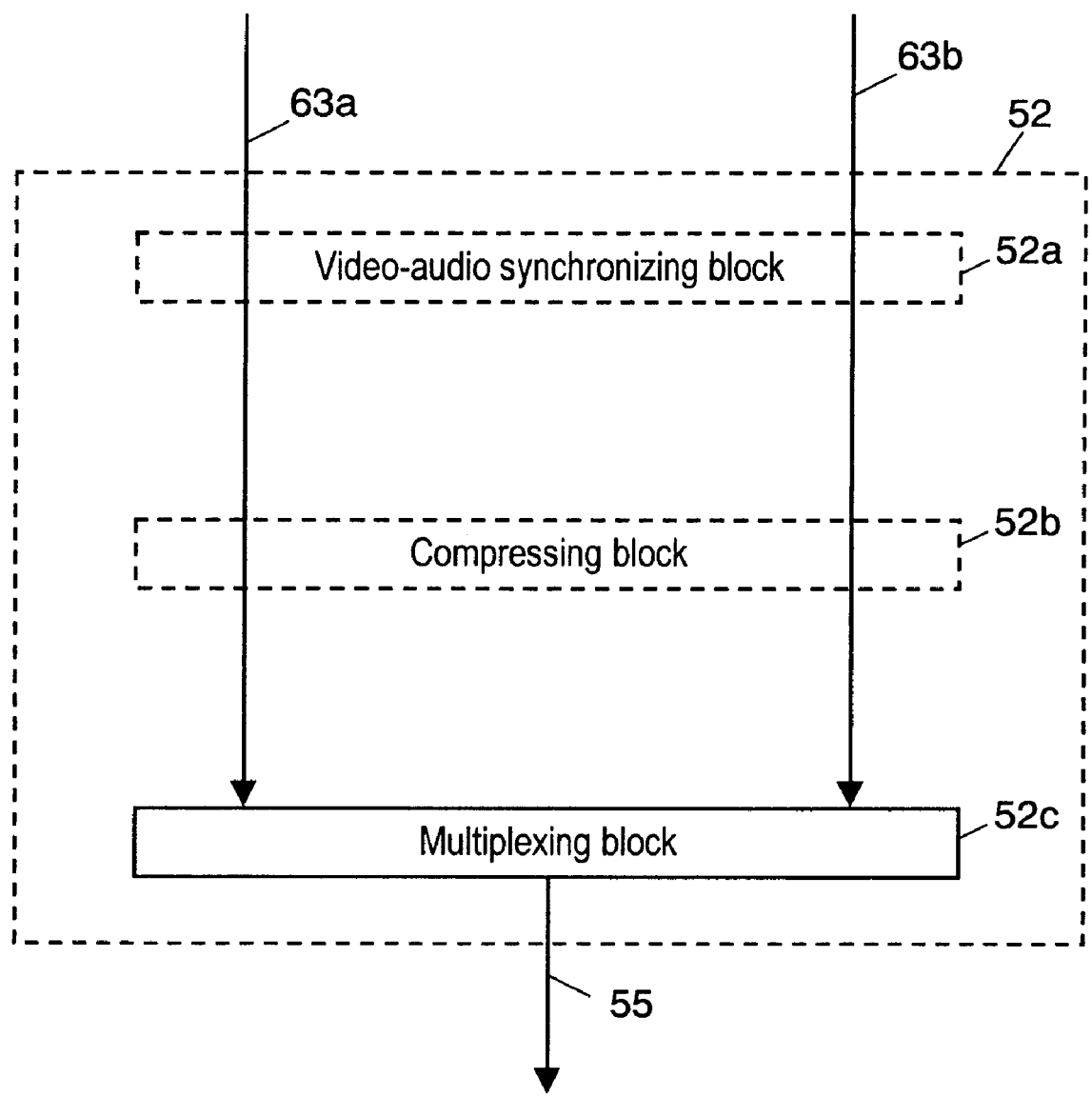

WIRELESS REMOTE OPERATION SYSTEM

FIELD OF THE INVENTION

The present invention relates to a wireless remote operation system including a server and a client who remotely operates the server by radio, more particularly it relates to a wireless remote operation system in which the client can smoothly reproduce an audio-accompanying moving picture supplied from the server.

BACKGROUND OF THE INVENTION

A wireless remote operation system including a server and a client has been widely used in enterprises. The "remote desk-top" proposed by Microsoft Inc. is one of them. A conventional wireless remote operation system represented by the "remote desk-top" is described hereinafter with reference to FIG. 12, FIGS. 13-16.

FIGS. 12A and 12B show structures of the conventional wireless remote operation system. FIG. 12A shows a structure of server 101, and FIG. 12B shows a structure of hardware at client.

First, the hardware structure of the server is described. In server 101, central processing unit 102 controls the overall server.

First memory 103, in general uses DRAM and works as a main memory for storing data. Second memory 104, in general, uses a hard-disc and works as an external memory for storing an OS and applications. Third memory 105 uses replaceable recording media such as a compact disc (CD) or a digital versatile disc (DVD) and works as a sub-memory for storing picture data and music data.

Display 106 displays an on-screen control panel or processed data on a cathode ray tube (CRT) or a liquid crystal display (LCD). Communicator 107 communicates with the outside through a modem or local area network (LAN) board. Radio section 108 communicates with client 121 by radio.

Input controller 109 controls input devices such as a keyboard and a mouse coupled to controller 109. Moving-picture generator 110 generates moving pictures, and audio-output section 111 reproduces audio-data through a speaker. Power supply 112 powers respective elements of server 101. Power switch 113 turns power-supply 112 on or off. Bus 114 includes and power lines coupling the foregoing elements with each other.

Next, the hardware structure of client 121 is described. CPU 122 controls an overall operation of client 121. Display 123 displays a picture on a CRT or an LCD. Radio section 124 communicates with radio section 108 of server 101 via radio communication route.

Both of radio-sections 108 and 124 of server 101 and client 121 use a communication method in accordance with the allowing standard as a protocol: e.g., IEEE802.11a having max. transfer rate of 54 MB/sec in 5 GHz band or IEEE802.11b having max. transfer rate of 11 MB/sec in 2.5 GHz band.

Input controller 125 controls input devices such as a keyboard and a mouse coupled to controller 125. Audio-output section 126 reproduces audio-data supplied from server 101 through a speaker. Power supply 127 powers respective elements of client 121 to work properly. Power switch 128 turns power-supply 127 on or off. Bus 129 includes signal-lines and power lines coupling the foregoing elements with each other.

An operation of the conventional wireless remote operation system is described with reference to FIGS. 13-16. FIG. 13 illustrates a displaying operation by the server alone in the conventional wireless remote operation system. Displaying the data of application software 131 is described hereinafter. This application software 131 handles both of the data of audio-accompanying moving picture which has a data-format unique to each application software, and the data of operation-related audio and display which has a data format common to the system.

The common data format of data 132 of operation-related audio and display largely depends on the hardware so that the hardware can be operated with ease. The audio data-format generally uses the pulse code modulation (PCM) format. The display data-format generally uses the RGB format that displays each one of pixels of a picture with an intensity of three primary colors, ie., red (R), green (G) and blue (B).

Application software 131 outputs data 132 of operation-related audio and display directly to video-audio reproducing block 138. Data 133 of audio-accompanying moving-picture supplied from software 131 is converted by video-audio conversion-into-common-format block 134 into data 137 of video-audio in common format, then id to video-audio reproducing block 138.

Conversion-into-common-format block 134 has independent decoding modules corresponding to the respective unique formats in order to receive audio-accompanying moving picture data in a unique format and to convert the data of audio and video into those in the common format within the system.

Video-audio reproducing block 138 reproduces the data of video-audio supplied in the common format, and outputs video data 139 on display 106 as well as audio data 140 to audio-output section 111.

In the case of displaying moving pictures, operation-related background picture 106b, which shows buttons for reproducing back or halting the moving pictures, and moving picture 106c are displayed on display screen 106a of display 106. Output sound 111a supplied from audio-output section 111 includes operation-related sound 111b such as alarm for user's operation-error and moving-picture related sound 111c such as background music and voice accompany the moving picture.

FIG. 14 illustrates a remote displaying operation in the conventional wireless remote operation system. Application software 131 of server 101 outputs data 132 of operation-related audio and display directly to video-audio converting bloc 141 used for remote operation. Data 133 of audio-accompanying moving-picture supplied from application software 131 is converted by video-audio conversion-into-common-format block 134 into video-audio data 137 in common-format, then fed into video-audio converting block 141 to be used or remote operation.

Video-audio converting block 141 converts video-audio data 137 in the common format and operation-related audio-display data 132 into video-audio data 142 for remote operation and transmitted between server 101 and client 121, and outputs data 142 to remote control block 143.

Remote control block 143 of server 101 includes a coupling status monitor, a radio communicator, and a command analyzer, although those elements are not shown in FIG. 14. The coupling-status monitor monitors the coupling statuses in client 121. The radio communicator transmits and receives commands and display data to and from client 121. The command analyzer analyzes the command supplied from client 121 and starts an application of server 101.

Remote control block 143 of server 101 transmits video-audio data 142 used for remote operation to client 121 via radio section 108.

Remote control block 145 of client 121 receives data 146 of video-audio used for remote operation from server 101 via radio section 124 and outputs it to video-audio reproducing block 147 used for remote operation Block 147 reproduces data 146 supplied.

The video data for remote operation out of output 148 is output on display 123 and displayed as displayed-picture 123a on which operation-related around picture image 123b, moving-picture image 123c are superimposed. Audio data for remote operation out of output 148 is output to audio output section 126, and reproduced as output sound 126a on which operation-related 126b and picture-related sound 126c are superposed.

The foregoing video and audio are included in output 148, thus the data amount of output 148 is so huge. FIG. 15 details the operation of the server in the conventional wireless remote operation system.

Application software 131 outputs data 133 of audio-accompanying moving picture in a format unique to respective applications to audio-accompanying video data separating block 134a of video-audio conversion-into-common-format block 134. Block 134a separates data 133 into audio data 135 in its original format and video data 136 in its original format, and outputs audio data 135 to audio-data conversion-into-common-format block 134b, and outputs video data 136 to video-data converting-into-common-format block 134c.

Converting block 134b converts audio data 135 into PCM audio data 137a, and outputs it to audio data converting block 141a of video-audio converting block 141. Video-data converting-into-common-format block 134c converts video-data 136 in the original format into video data 137b in RGB format or YUV format as the common format, and outputs it to video-data converting block 141b. Selection of RGB or YUV format as the common format can be done with format control signal 144 supplied from block 141b.

Audio-data converting block 141a synthesizes operation-related audio data 132a in PCM format and audio data 137a in PCM format, and converts the synthesized data into audio data 142a to be used for remote operation in PCM format, then output converted audio data 142a to remote control block 143. Audio data 142a is transmitted by radio to client 121.

Video-data converting block 141b synthesizes operation-related display data 132b in RGB format and video-data 137b in RGB format, and converts the synthesized data into video data 142b in RGB format to be used for remote operation, then outputs data 142b to remote control block 143 of the server. Data 142b is transmitted to client by radio. Block 143 of server 101 synthesizes audio data 142a in PCM format and video data 142b in RGB format, and transmits the synthesized data to client 121 by radio as video-audio data to be used for remote operation.

FIG. 16 details the operation done by client 121 in the conventional wireless remote operation system. Remote control block 145 separates the video-audio data for remote operation supplied from server 101 into audio data 146a for remote operation in PCM format and video data 146b or remote operation in RGB format. Block 145 outputs audio data 146a to audio reproducing block 147a of video-audio reproducing block 147 to be used or remote operation as well as outputs video data 146b to video reproducing block 147b.

Audio reproducing block 147a reproduces audio data 146a, and outputs audio data 148a to audio output section 126. Video reproducing block 147b reproduces video data 146b, and outputs video data 148b in RGB format to display 123.

In this conventional wireless remote operation system, when moving pictures are transmitted to the client from the server, an amount of data to be transmitted is so huge that the present transmission bandwidth is sometimes not enough to carry the data. At the client, the data amount received is so huge that the moving pictures sometimes cannot be reproduced smoothly.

Further, picture data of huge amount and audio-data of small amount are separately transmitted, so that a time difference happens between the picture data and the audio data because the picture data needs more time to process than the audio data corresponding to the picture data.

The conventional wireless remote operation system is largely influenced by whether or not a data format of moving picture and a compression method are on public view, and the presence of private formats possibly prevents a unified system from being established.

SUMMARY OF THE INVENTION

The present invention aims to provide a wireless remote operation system that can smoothly reproduce audio-accompanying moving pictures supplied from a server at a client with the pictures synchronized with the sound. The system of the present invention includes the server and the client.

The server handles application software and includes the following elements:

a video-audio conversion-into-common-format section for receiving audio-accompanying moving picture data in a format unique to respective application software and supplied from the application software, and converting the data into video-audio data in common format thin the system, then outputting the data;

a video-audio distributing section for receiving the video-audio data in common format, and outputting data of audio-accompanying moving picture and data of moving-picture area which includes data corresponding to the moving picture of the audio-accompanying video data as a predetermined data;

a section that processes the transmission of audio-accompanying video data for receiving the data of audio-accompanying video, adding synchronizing data that synchronizes audio to video, compressing the data into a data-stream including data about audio and video before outputting the data-stream:

a video-audio converting section for obtaining data of operation-related display-audio to be used for remote operation by adding the data of moving-picture area to operation-related display-audio data obtainable from the application software;

a first remote controller for receiving the data of operation-related display-audio to be used for remote operation and the data stream before outputting them; and a client for receiving the data of operation-related display-audio to be used or remote operation and the data stream supplied from the server, and reproducing video and audio to be used for remote operation, and controlling the application software in the server in response to user's operation related to those video and audio to be used for remote operation.

Further at the client, a second remote controller receives data from the first remote controller, and outputs the data of operation-related display-audio to be used for remote operation and the data stream. Audio-accompanying moving picture reproducing processing section receives the data stream, decodes and outputs the decoded data with the video and the audio synchronized.

The foregoing structure allows the server to distribute the application software of audio-accompanying moving-picture data to clients independently, and also allows the clients to control the application software in the server independently through remote operation.

The audio-accompanying moving-picture data is compressed by, e.g., MPEG 2, so that the data amount to be transmitted is reduced, which lightens the load applied to a transmission bandwidth. As a result, smooth drawing at the client can be expected. In order to synchronize video with audio at reproducing, moving-picture data and its related audio-data are transmitted to the client as the data accompanied by synchronizing-data. An out of sync. in reproducing the data at the client can be thus prevented.

Further, the present invention can provide a system in response to any methods of compression and any formats of data regardless of public or private.

BRIEF DESCRIPTION OF THE DRAWINGS

FIG. 2 shows a functional block diagram illustrating a remote displaying function and a remote operating function of a server in a wireless remote operation system in accordance with a first exemplary embodiment of the present invention.

FIG. 3 shows a functional block diagram illustrating a remote displaying function and a remote operating function at the client in accordance with the first exemplary embodiment.

FIG. 10 shows a functional block diagram detailing an audio-accompanying moving-picture transmission processing block in accordance with the second exemplary embodiment.

DESCRIPTION OF THE PREFERRED EMBODIMENTS

Exemplary Embodiment 1

Figure 1A:
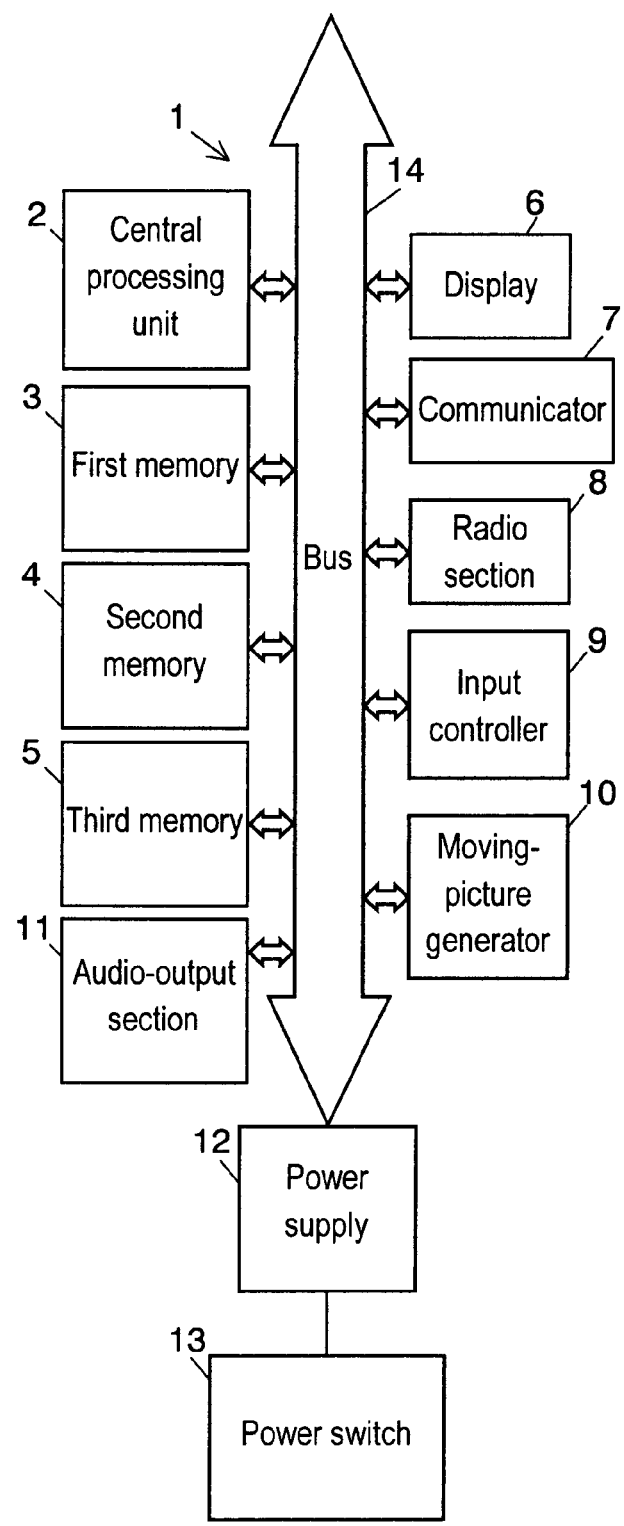
FIG. 1A shows a hardware structure of a server of a wireless remote operation system of the present invention.
Figure 1B:
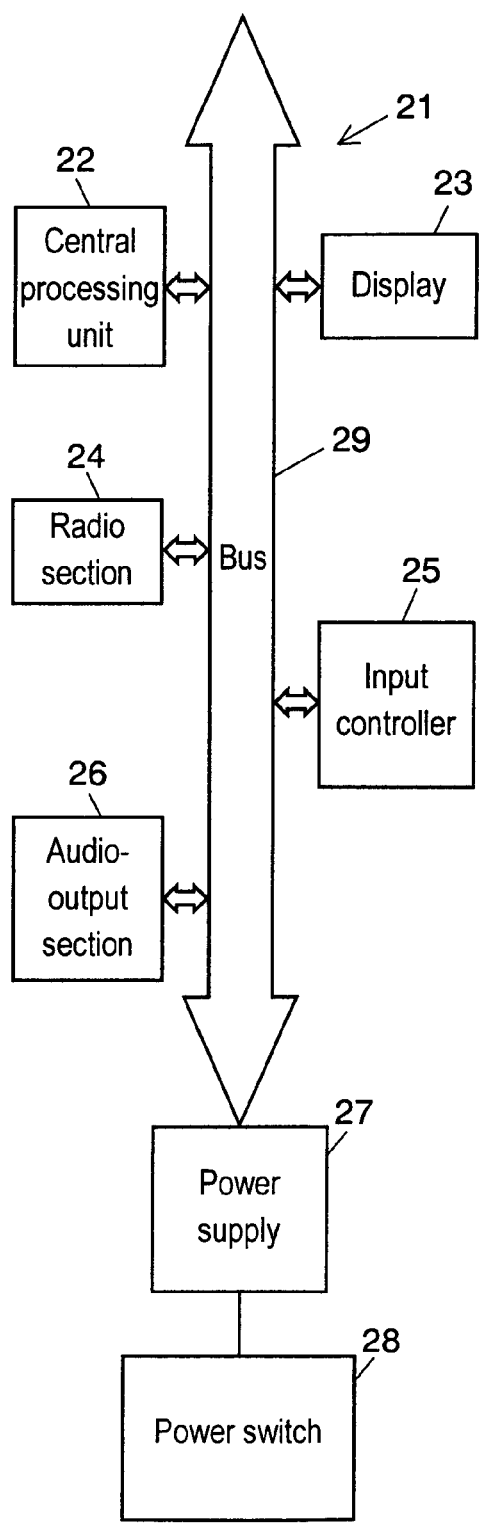
FIG. 1B shows a hardware structure at a client of a wireless remote operation system of the present invention.

The first exemplary embodiment is demonstrated hereinafter with reference to accompanying drawings. FIGS. 1A and 1B illustrate hardware structures of a server and a client of a wireless remote operation system of the present invention. FIG. 2 illustrates a remote display function and a remote operation function of the server in the wireless remote operation system in accordance with the first embodiment. FIG. 3 illustrates a remote display function and a remote operation function at client.

In server 1, central processing unit 2 controls the overall server. First memory 3 uses a dynamic random access memory (DRAM) and works as a main memory for storing data. Second memory 4 uses a hard-disc and works as an external memory for storing an operating system (OS) and applications. Third memory 5 uses replaceable recording media such as a CD or a DVD and works as a sub-memory for stow video data and music data.

Display 6 displays an on-screen control panel or processed data on a CRT or an LCD. Communicator 7 communicates with the outside through a modem or local area network (LAN) board. Radio section 8 communicates with client 21 by radio.

Input controller 9 controls input devices such as a keyboard and a mouse coupled to controller 9. Moving-picture generator 10 produces moving pictures, and audio-output section 11 reproduces audio-data using a speaker. Power supply 12 powers respective elements of server 1. Power switch 13 turns power-supply 12 on or off. Bus 14 includes signal-lines and power lines coupling the foregoing elements.

Next, the hardware structure of client 21 is described. Central processing unit 22 controls an overall operation of client 21. Display 23 displays a picture on a CRT or an LCD. Radio section 24 communicates with radio section 8 of server 1 via radio communication route.

Radio-section 8 of server 1 and radio-section 24 of client 21 use a communication method in accordance with the following method as a protocol, e.g., IEEE802.11a having max. transfer rate of 54 MB/sec in 5 GHz band or IEEE802.11b having max. transfer rate of 11 MB/sec in 2.5

GHz band Input controller 25 controls input devices such as a keyboard and a mouse coupled to controller 25. Audio-output section 26 reproduces audio-data supplied from server 1 through a speaker. Power supply 27 powers respective elements of client 21 to work properly. Power switch 28 turns power-supply 27 on or off Bus 29 includes signal-lines and power lines coupling the elements.

Other elements that do not directly relate to the demonstration of the present invention are not shown in the drawings.

This embodiment relates to a method of obtaining smoothly moving pictures with sound synchronized to the pictures at the client in response to various data of moving pictures delivered to server 1 via communicator 7 shown in FIG. 1A. In this embodiment, data processing on moving pictures delivered from a wide-area network is demonstrated, where a method of data compression and a data format are not on public view and still kept in private.

In FIG. 2, application software 31 of server 1 outputs data 32 of operation-related audio and display directly to video-audio converting block 41 to be used for remote operation. Data 33 of audio-accompanying moving-picture supplied from software 31 is converted by video-audio conversion-into-common-format block 34 into video-audio data 37 in common-format, then fed into video-audio distributing block 51.

Various data such as audio data, display data, and video data are in formats unique to respective application software, and this is called here a unique format. On the other hand, the common format refers to a format of data and a signal used commonly in the systems, where each one of the systems including a server and a client.

One or a plurality of application software 31 of the server have at least audio-accompanying moving-picture data, operation-related audio data, operation-related display data respectively in a unique format. Among them, operation-related audio-&splay data 32 is directly output to video-audio converting block 41 to be used for remote operation.

Video-audio data converting block 41 converts operation-related audio-display data 32 into video-audio data 56 to be used for remote operation and to be transmitted between the server and the client, and outputs data 56 to remote control block 43.

Data 33 of audio-accompanying moving picture in unique format is supplied to video-audio data conversion-into-common-format block 34, and converted into video-audio data 37 in common format. Video-audio distributing block 51 receives data 37 and outputs audio-accompanying video data 53 and moving-picture area data 54.

In distributing block 51, audio-accompanying video data 53 is processed into a format easy to be compressed. Moving-picture area data 54 indicates a portion corresponding to a displayed portion of moving picture of data 53, so that data 54 is generated as a predetermined data to be embedded in a data stream. For instance, the following data as the predetermined data are embedded into the data stream.

The data of coordinate that specifies a location and a size of displayed portion of the moving picture and the data of designated color (Color Key) indicates the displayed portion of the moving picture are embedded in the data stream. In other words, the moving picture is displayed only at the place colored with the designated color.

Audio-accompanying video data 53 is fed into block 52 that processes the transmission of the audio-accompanying moving-picture data. Data 53 is subject to processing, in which its moving-picture and related audio are synchronized by video-audio synchronizing block 52a, for a preparation for being reproduced and output by client 21. Then the processed reproduced data is output as data 57.

Compressing block 52b compresses data 57, and outputs compressed data 58 to multiplexing block 52c, which then supplies stream-data 55 of audio-accompanying compressed moving-picture to be used for remote operation to remote control block 43.

Video-audio data converting block 41 outputs operation-related display-audio data 56 to be used for remote operation and consisting of only operation related data. The output of conversion block 41 does not include the data of moving picture per se.

Transmitting processing block 52 includes video-audio synchronizing block 52a, compressing block 52b, and multiplexing block 52c. Synchronizing block 52a outputs audio-video data 57 accompanied by synchronizing data so that the moving picture and the picture-related audio can be synchronized when the data is reproduced at the client before the data is output.

Audio-video data 57 accompanied by synchronizing data is produced through the following process: video-audio synchronizing block 52a separates the audio data from the video data of data 53 at given intervals. In other words, block 52a divides data 53 into predetermined data-units, and inserts numeric data that work as the synchronizing data into the video data and the audio data of the audio-accompanying video data 53. To be more specific, flags are provided to the video data and the audio data on a time basis or a frame basis in order to bring video into sync. with audio.

This mechanism allows synchronizing video data and audio data at every given data-unit when the data are reproduced, namely, the foregoing numeric data is used as a mark or synchronizing the video and the audio, so that the numeric data works as a stamp for synchronization.

Compressing block 52b compresses the audio data and the video data of audio-video data 57 accompanied by the synchronizing data. A well-known technique such as Moving Picture Expert Group (MPEG) is used as a compression technique. Block 52b outputs compressed audio-video data 58.

Multiplexing block 52c has a similar function to video-audio data converting block 41, and converts the data received into a streaming data where the audio data and the video data are included in one stream on a time basis. Multiplexing block 52c outputs stream-data 55, for remote operation, of audio-accompanying compressed moving-video accompanied by the synchronizing data.

Remote control block 43 interprets operation-related display-audio data 56 for remote operation as well as stream-data 55, for remote operation, of audio-accompanying compressed moving-picture with the synchronizing data as an independent data respectively, and transmits these two data to client 21 via radio section 8. Block 43 includes a coupling-status monitor, a radio communicator, and a command analyzer, although they are not shown in FIG. 2.

The coupling-status monitor monitors the coupling statuses in client 21. The radio communicator transmits and receives commands and display-data to and from client 21 via radio section 8. The command analyzer analyzes the command supplied from client 21 and boots an application of server 1.

Block 43 transmits operation-related display-audio data 56 for remote operation to client 21 via radio section 8.

At the place of client 21, radio section 24 receives signals transmitted from server 1. To be more specific, remote control block 45 of client 21 obtains, via radio section 24, operation-related display-audio data 56 for remote operation and stream-data 55 of audio-accompanying compressed moving-picture for remote operation from server 1.

Video data 56b out of display-audio data 56 is output on display 23 and displayed as display screen 23a, on which operation-related background image 23b and moving picture image 23c are superposed. Audio data 56a is output to audio output section 26 and reproduced as output sound 26a, on which operation-related sound 26b and moving picture-related sound 26c are superposed and reproduced. Operation-related background image 23b and operation-related sound 26b are thus obtained. Detailed operation thereof are described later.

A portion corresponding to the moving picture in operation-related background image 23b, i.e., the data indicating the portion corresponding to moving-picture image 23c, has been added to server 1 as moving-picture area data 54. Therefore, by referring to moving-picture area data 54, the portion corresponding to the moving picture is displayed together with image 23b within one screen on display 23.

Stream data 55 of the audio-accompanying compressed moving picture is supplied to audio-accompanying moving-picture data reproducing processing block 59, which decompresses stream data 55, and synchronizes the video data and the audio data, then outputs moving-picture-related audio data 49 in PCM format and moving-picture-related picture data 50. In this case, video data 50 is used for displaying moving-video image 23c, and audio data 49 is used for producing moving-picture-related sound 26.

Remote control block 45 outputs direly operation-related display-audio data 56 for remote operation controlled to display 23 and audio output section 26. Data 56 includes the data to be used for displaying operation-related background image 23b on display 23 and the data to be used for producing operation-related sound 26b at audio-output section 26.

Moving-picture image 23c is superposed on operation-related background image 23b, and moving-picture-related sound 26c is superposed on operation-related sound 26b. The superposition of the moving-picture portion is carried out in the following manner:

(1) Since the moving picture portion has been prepared in a given format, this portion is detected at video reproducing block 59c in reproducing processing block 59, and a display location of the moving picture of data 50 is positioned to the place where the moving picture is displayed. Video reproducing block 59c will be described later.

or (2) Data of moving-picture display location is added to stream data 55 of the audio-accompanying compressed moving-picture.

(3) Display 23 of client 21 shown in FIG. 1 has a memory for storing just one displaying screen, thus a given data, ie., data 54 to be embedded in moving-picture area, can be detected. This detecting function is built in video reproducing block 59c described later, thereby realizing the superposition of the moving picture.

(4) Remote control block 43 of server 1 can transmit data independently to client 21. Thus the information about the display location of moving picture is transmitted as an independent data to be used for superposing the moving picture on operation-related background image 23b.

Audio-accompanying moving picture data reproducing processing block 59 includes multiplex-separation block 59a, decoding block 59b, and video reproducing block 59c.

Demultiplex block 59a releases the process prepared or transmission, namely, block 59a separates the stream data, which has been unified to one stream for transmission purpose, into compressed audio data and compressed video data. Thus compressed audio-video data 60 is obtainable, which is equivalent to compressed audio-video data 58 supplied from compressing block 52b shown in FIG. 2.

Decoding block 59b converts data 60 into audio-video data 61 accompanied by synchronizing data, where data 61 is equivalent to audio-video data 57 accompanied by synchronizing data shown in FIG. 2.

Based on the synchronizing data, video reproducing block 59c brings moving-picture-related video data 50 in YUV format into sync. with moving-picture-related audio data 49 in PCM format, and outputs data 50 and 49 to display 23 and audio output section 26 respectively.

The foregoing structure allows server 1 to transmit the data of audio-accompanying moving-picture and the operation-related data respectively as independent data to client 21. Client 21 processes those data as independent data respectively, and superposes those data for displaying an operation screen, so that an easy-operation environment is provided to a user.

In this case, it is possible to compress only the audio-accompanying moving-picture, thus no extra load is applied to the transmission band between the client and the server for smoothly reproducing the moving picture. The synchronizing data brings the moving picture into sync with the related sound, so that the moving-picture synchronized with the sound can be reproduced.

At the place of client 21, the user inputs a command in response to the displayed content on display 23, thereby remote-controlling server 1. For instance, the user can control the application software in server 1 with an appropriate command.

Figure 4A:
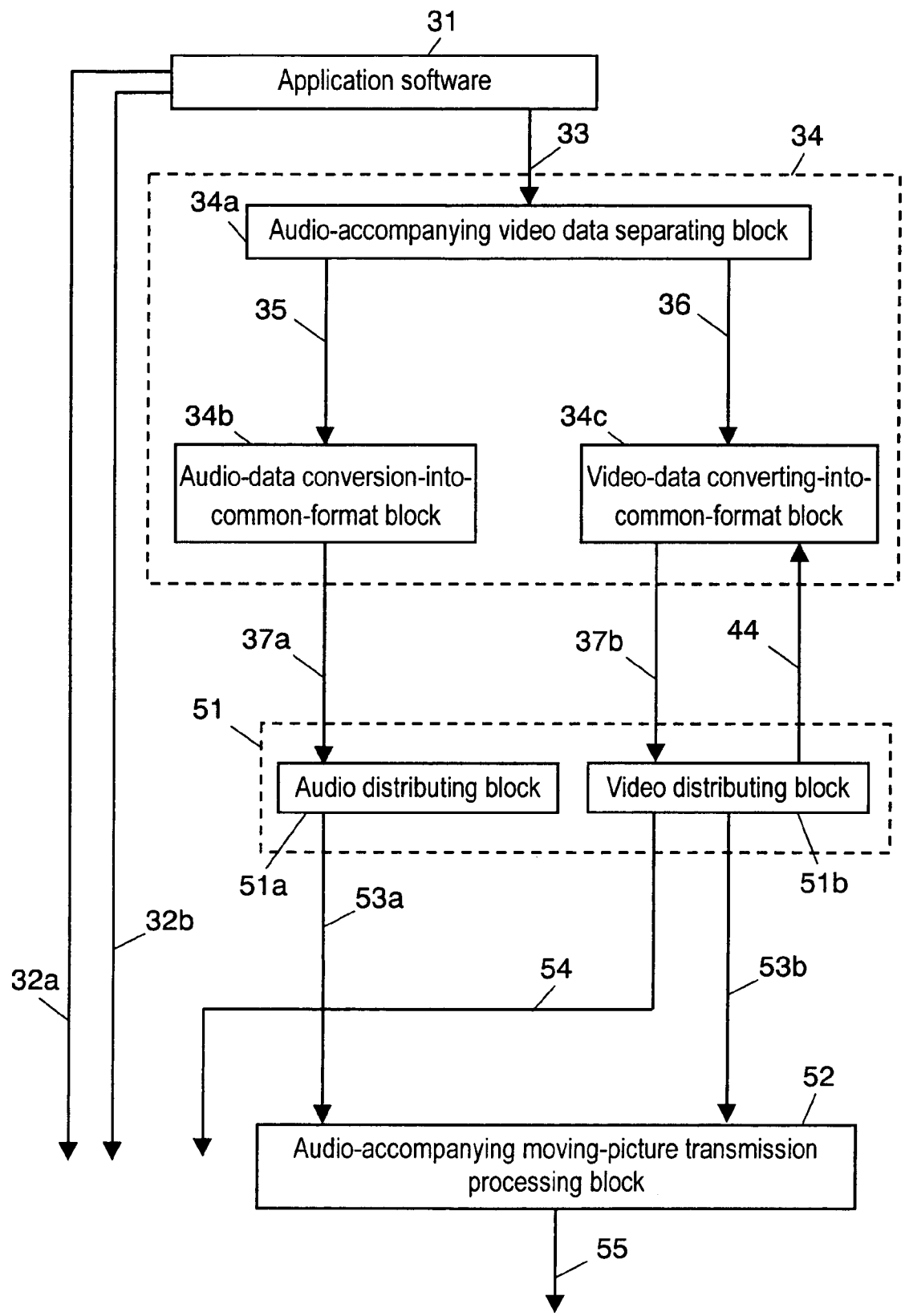
FIGS. 4A and 4B show functional block diagrams illustrating a remote display operation of the server in the wireless remote operation system in accordance with the first exemplary embodiment.
Figure 4B:
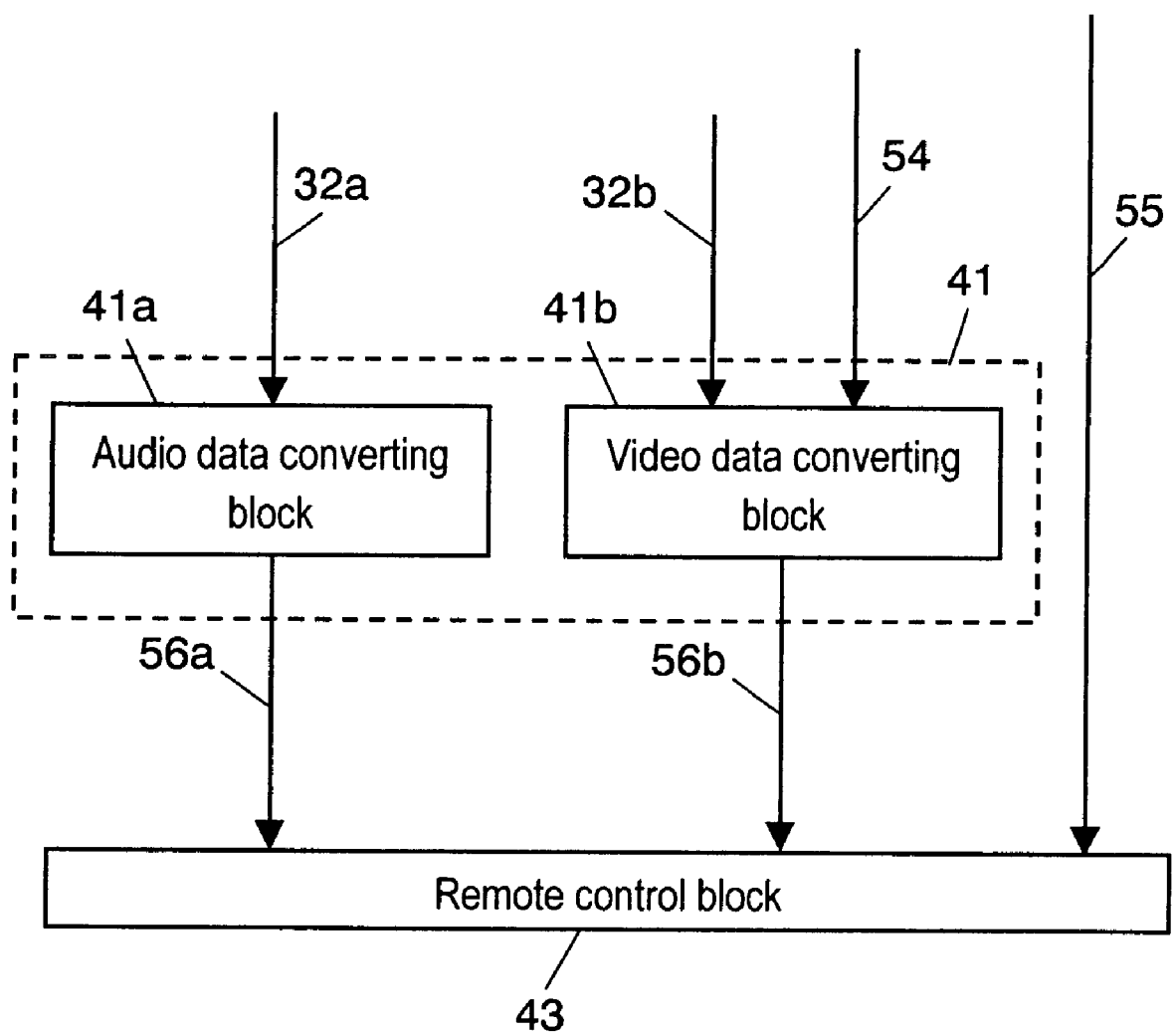
Figure 5:
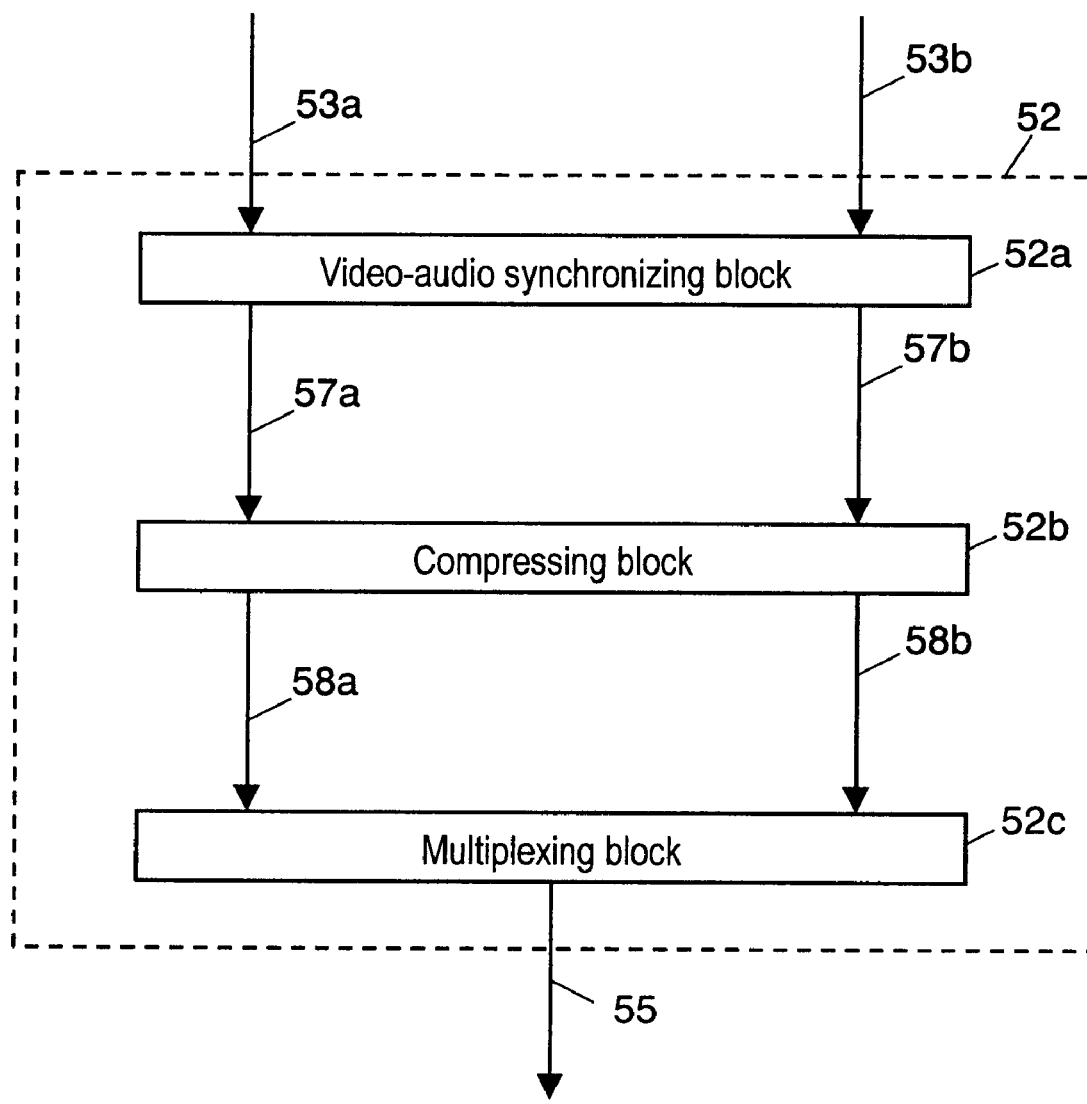
FIG. 5 shows a functional block diagram detailing an audio-accompanying moving-picture transmitting block in accordance with the first exemplary embodiment.
Figure 6:
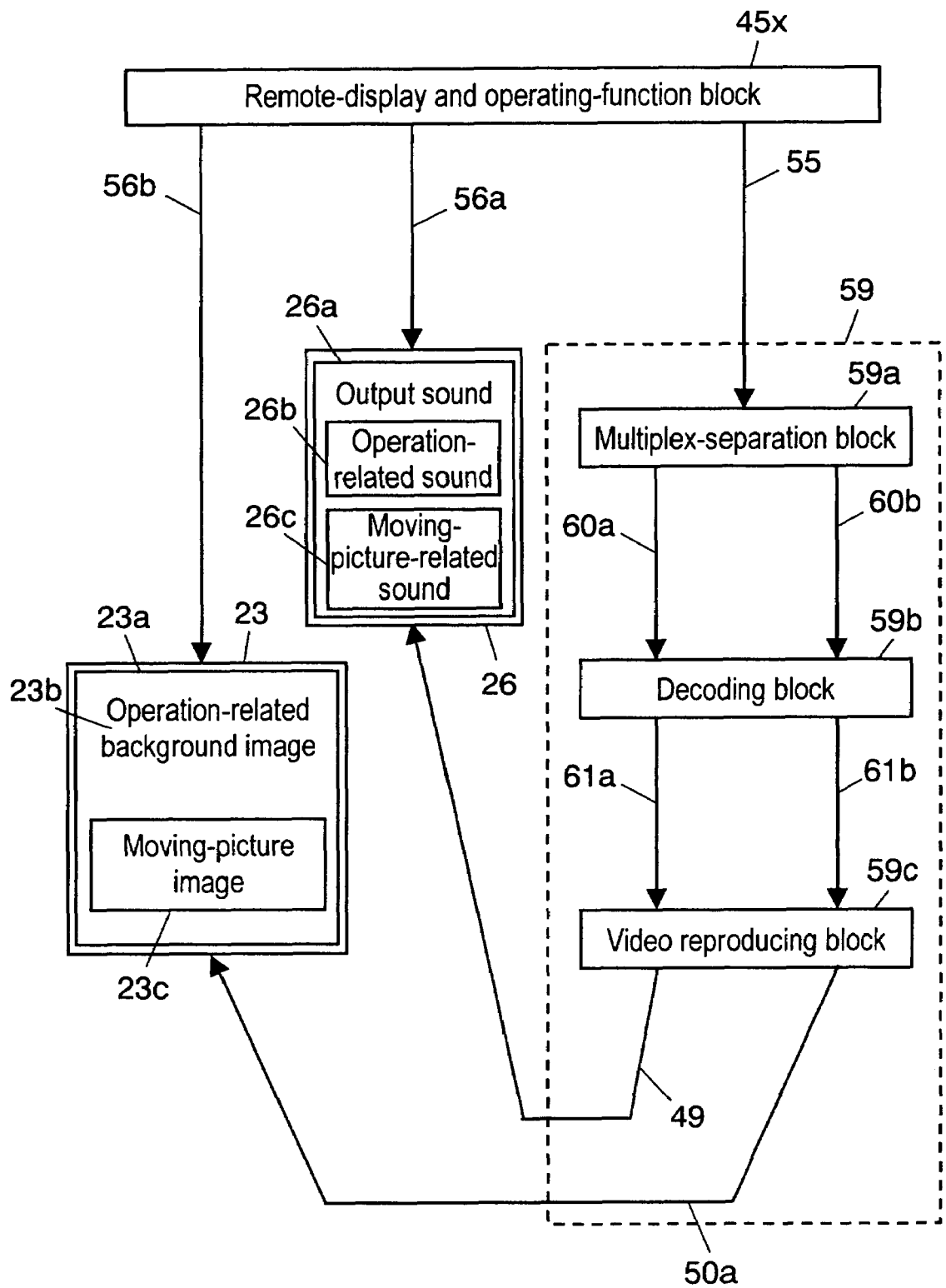
FIG. 6 shows a functional block diagram detailing a remote displaying function and a remote operating function at the client in accordance with a second exemplary embodiment.

The first embodiment is further described in detail with reference to FIGS. 4A, 4B, 5 and 6. FIGS. 4A, 4B detail the remote displaying function and the remote operating function of server 1 in the wireless remote operation system shown in FIG. 2. FIG. 5 details block 52 exclusively processing the transmission of the audio-accompanying motion-picture data shown in FIG. 2. FIG. 6 details the remote displaying function and the remote operating function at the client shown in FIG. 3. In the following descriptions, the elements already described have the same reference marks and the descriptions thereof are omitted.

In FIG. 4A, application software 31 outputs data 33 of the audio-accompanying moving picture in a format unique to respective applications to audio-accompanying video data separating block 34a of video-audio conversion-into-common-format block 34.

Separating block 34a separates data 33 into audio data 35 in its original format and video data 36 in its original format, and outputs audio data 35 to audio-data conversion-into-common-format block 34b as well as outputs video data 36 to video-data converting-into common-format block 34c.

Audio-data conversion-into-common-format block 34b converts audio data 35 into audio data 37a in PCM format, and supplies data 37a to audio distributing block 51a which processes audio data and belongs to the video-audio distributing block. Video-data converting-into-common-format block 34c converts video data 36 in an original format into video data 37b in YUV format (common video format), and outputs data 37b to video distributing block 51b.

In FIG. 4A, video-data converting-into-common-format block 34 can select RGB format or YUV format for the video data by using format control signal 44. In this embodiment, video data 37b is supplied from video-data conversion-into-common-format block 34 in YUV format using this function. In the case of compressing moving pictures in RGB format, it takes time to process because of a large amount of data; however, YUV format omits surplus data considering human visual sense, so that its compressed data amount is less than that of RGB format with picture quality maintained equal to that of RGB format in appearance. Thus video-data conversion-into common-format block 34 to output video data 37b is in YUV format.

Video-audio distributing block 51 includes audio distributing bloc 51a and video distributing block 51b. Since the audio data has been converted in PCM format by converting block 34b, data 37a can be used as it is. Block 51 outputs data 37a as moving-picture-related audio data 53a in PCM format.

Video distributing block 51b receives video data 37b in YUV format, and outputs moving-picture area data 54 in RGB format and moving-picture-related video data 53b in YUV format. Using the data indicating an area of the moving picture of data 37b in YUV format, block 51b produces moving-picture area data 54 in RGB format with every data maintained identical.

As discussed above, the conversion of the data into RGB format puts data 54 in the same format as operation-related video data 32b in RGB format obtained from application software 31. Data 54 and data 32b are thus transmitted as the display-data for one screen to video-audio converting block 41 shown in FIG. 4B. Moving-picture-related video data 53b in YUV format is equivalent to video data 37b in YUV format.

Audio-accompanying moving-picture transmission processing block 52 receives moving-picture-related audio data 53a in PCM format and moving-picture-related video data 53b in YUV format, and produces data stream 55 of audio-accompanying compressed moving-picture for remote operation.

FIG. 4B shows the structure of server 1 continued from FIG. 4A. Video-audio converting block 41 includes audio data converting block 41a and video data converting block 41b. Block 41a outputs operation-related audio data 66a in PCM format in which audio data only related to operation processed is included. Block 41b receives operation-related display data 32b and moving-picture area data 54 in RGB format, and outputs operation-related video data 56b in RGB format, where data 56b only relates to one operation. As previously discussed, area data 54 is a predetermined data indicating the portion corresponding to the moving picture.

Remote control block 43 receives operation-related audio data 56a in PCM format for remote operation, operation-related video data 56b in RGB format, and stream-data 55 of audio-accompanying compressed moving-picture where this data 55 only handles the portion of moving-picture, then outputs those data as an independent data respectively to client 21 via radio section 8.

FIG. 5 details an operation of audio-accompanying moving-picture data transmission processing block 52. In FIG. 5, video-audio synchronizing block 52a, compressing block 52b, and multiplexing block 52c perform in the same way as discussed in FIG. 2. FIG. 5 shows that the audio data related to moving picture and the moving-picture data are processed independently in the respective blocks.

Numeric data are inserted into respective data for bringing those data into sync. with each other, i.e., moving-picture-related video data 53b in YUV format is synchronized with moving-picture-related audio data 53a in PCM format corresponding to data 53b. That is, the numeric data for sync. are inserted into data 53b and data 63a as sync. data. Video-audio synchronizing block 52a thus outputs moving-picture-related audio data 57a in PCM format accompanied by the synchronizing data and moving-picture-related video data 57b in YUV format accompanied by the synchronizing data. The synchronizing data is sometimes called a synchronizing stamp.

Compressing block 52b receives those data, and compresses them, then outputs compressed audio data 58a and compressed video data 58b.

Multiplexing block 52c receives those data, and outputs stream-data 55 of audio-accompanying compressed moving-picture. Data 55 is a streaming data along the time axis.

FIG. 6 details client 21. Remote-display and operating-function block 45x is included within remote control block 45, and block 45x can be an external independent block coupled to control block 45.

Demultiplex block 59a obtains data 60a and data 60b from stream data 55, and data 60a, 60b are the same as compressed audio data 68a and compressed video data 58b supplied from compressing block 52b of the server shown in FIG. 5.

Decoding block 59b obtains moving-picture-related audio data 61a in PCM format and moving-picture-related video data 61b in YUV format accompanied by the synchronizing data. Audio data 61a and video data 61b are the same as audio data 57a and video data 57b of server 1 shown in FIG. 5.

Based on the synchronizing data, video reproducing block 59c outputs video data 61b and audio data 61a to display 23 respectively, while block 59c makes data 61b and data 61a synchronize with each other.

Operation-related display-audio data 56 received is reproduced as audio data 56a and video data 56b by remote-display and operating-function block 45x. Audio data 56a is output to audio output section 26 and reproduced as output sound 26a, which includes operation-related sound 26b superposed by moving-picture-related sound 26c.

The video data is output on display 23 and displayed as display-screen 23a, which includes operation-related background image 23b superposed by moving-picture image 23c.

In the foregoing discussion, the flows of moving-picture-related audio data and video data are independently described. Operations and structures of block 52 exclusively processing the transmission of the audio-accompanying moving-picture data, and block 59 processing the reproduction of the audio-accompanying moving-picture data are specifically described. The video data is handled in YUV format instead of RGB format, so that the video data can be compressed at the server and decompressed at the client easily with picture quality maintained.

Operations of the respective blocks demonstrated in this embodiment can be realized by software, or units of hardware. Operations of some blocks can be realized by software, and those of others can be realized by units of hardware. An operation of each one of the blocks can be realized by a combination of software and units of hardware.

Exemplary Embodiment 2

Figure 7:
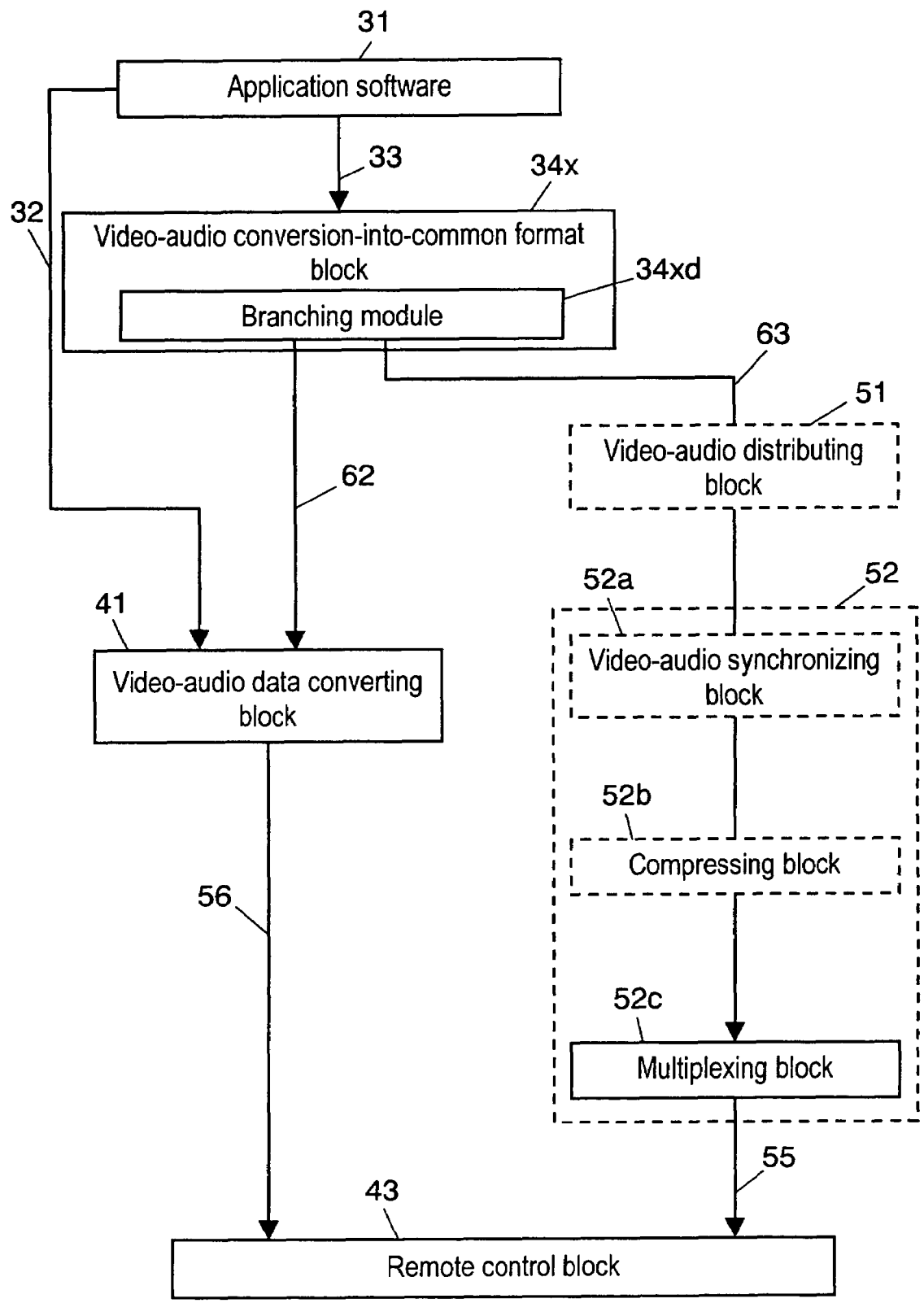
FIG. 7 shows a functional block diagram illustrating a remote displaying function and a remote operating function of a server in a wireless remote operation system in accordance with the second exemplary embodiment of the present invention.
Figure 8:
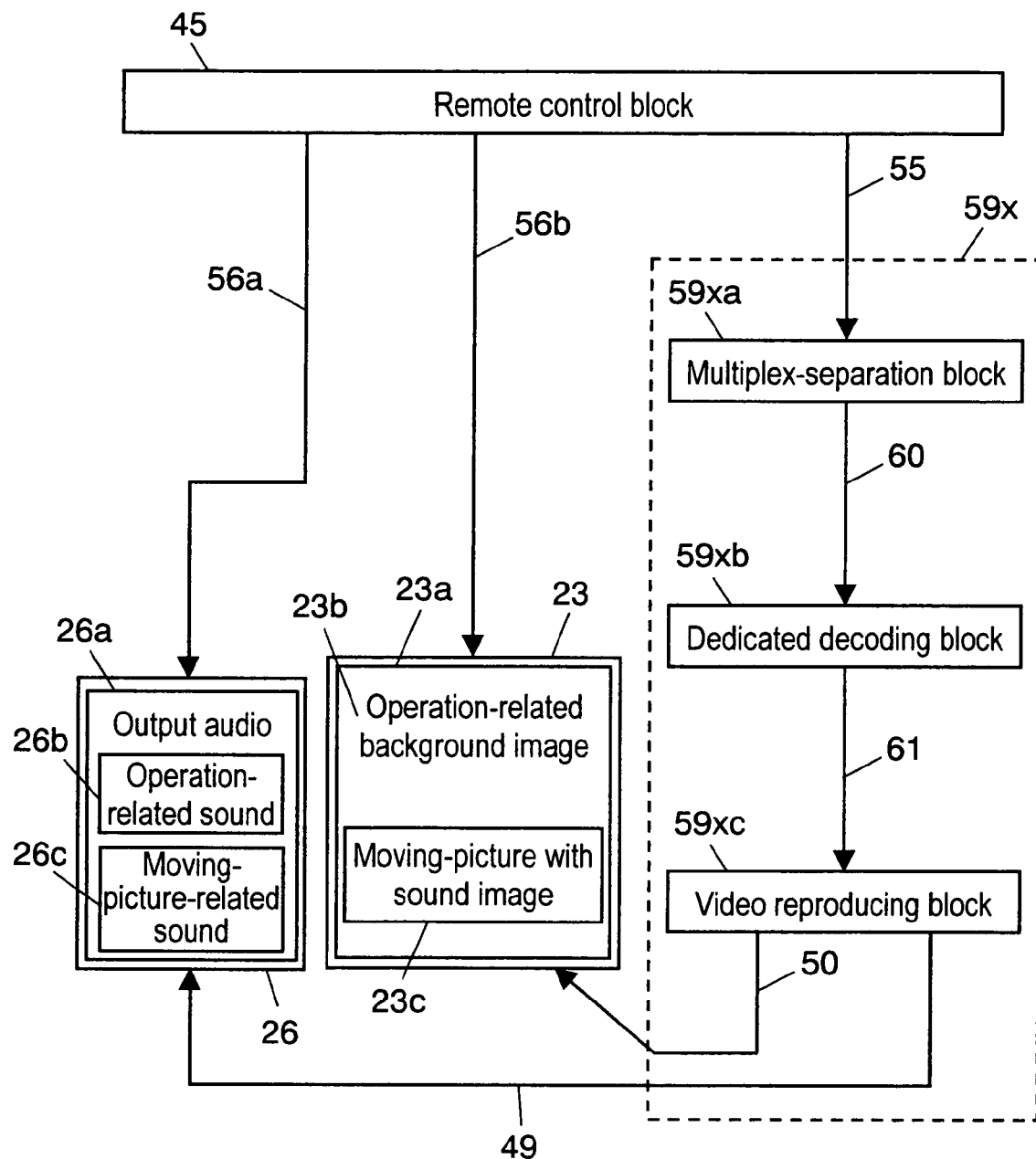
FIG. 8 shows a functional block diagram illustrating a remote displaying function and a remote operating function at the client in accordance with the second exemplary embodiment.
Figure 9A:
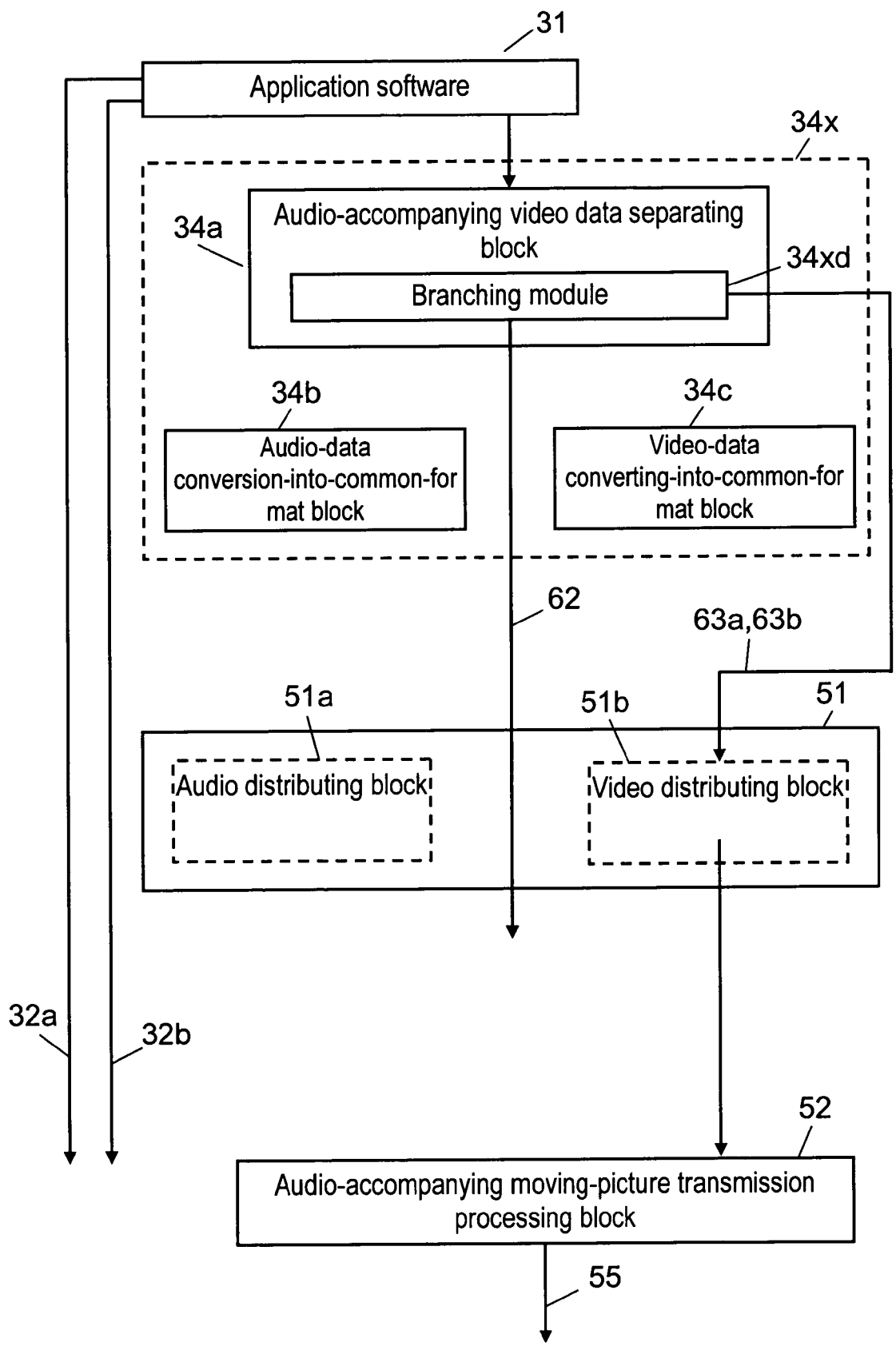
FIGS. 9A and 9B show functional block diagrams illustrating a remote display operation of the server in accordance with the second exemplary embodiment.
Figure 9B:
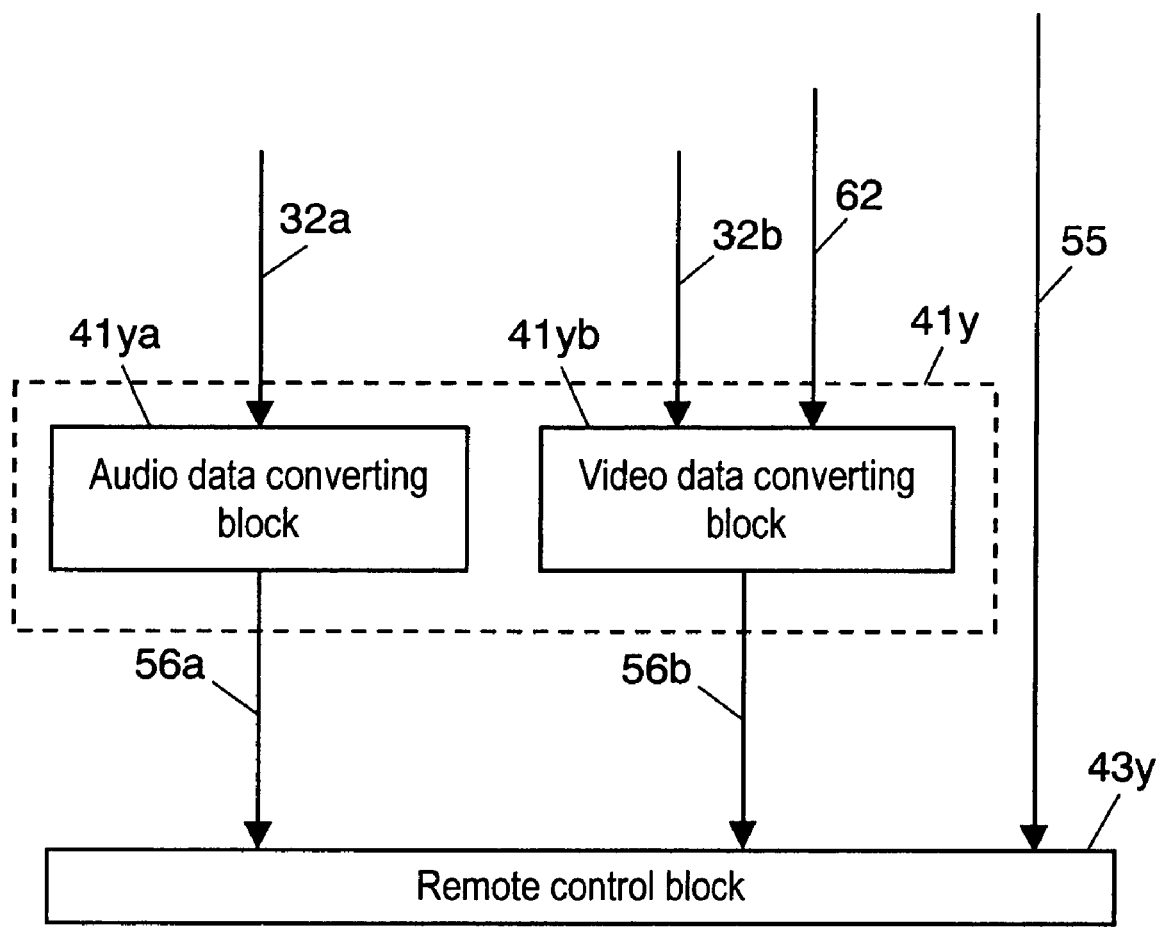
Figure 11:
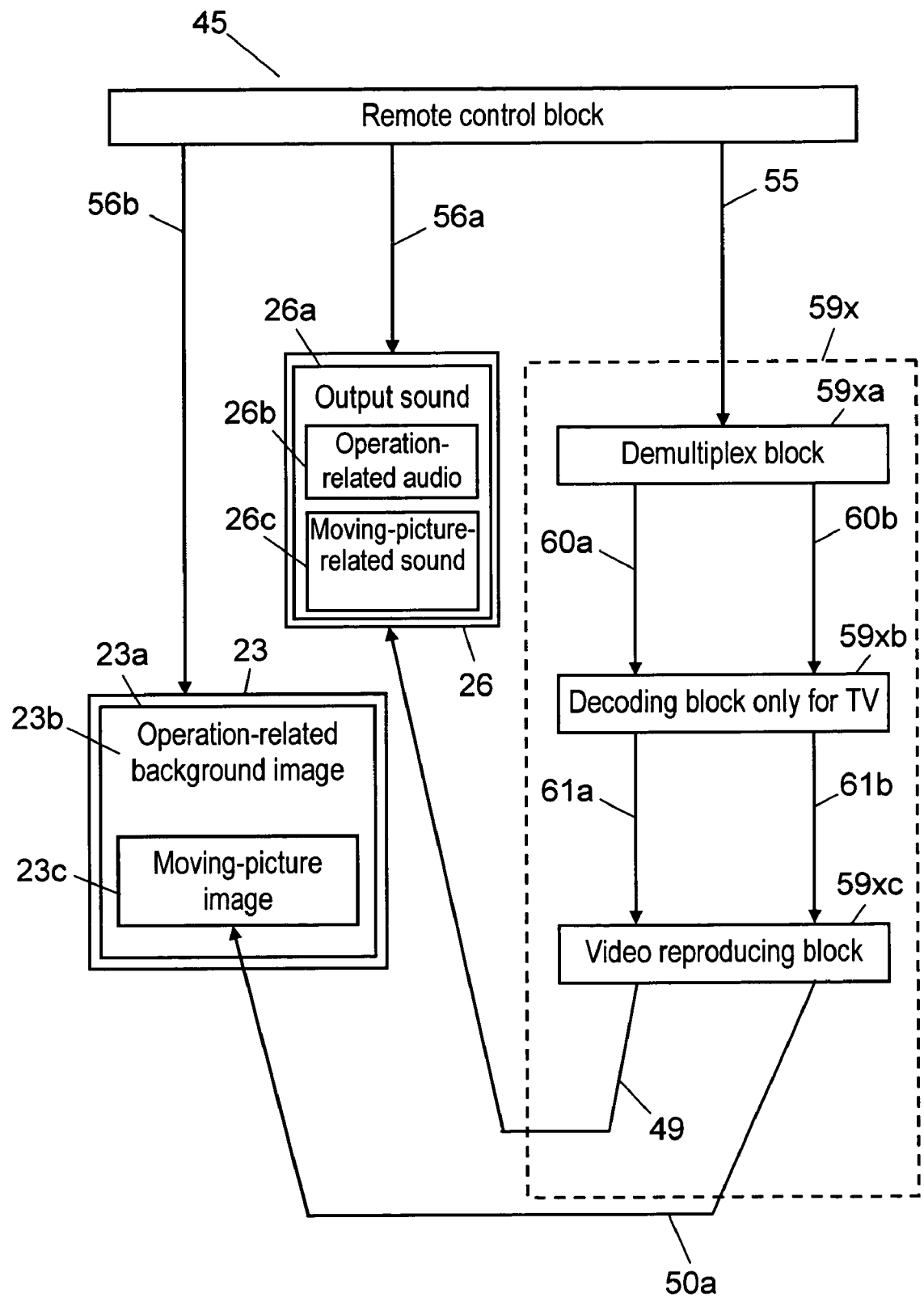
FIG. 11 shows a functional block diagram illustrating a remote display function at the client in accordance with the second exemplary embodiment.
Figures 12A, 12B:
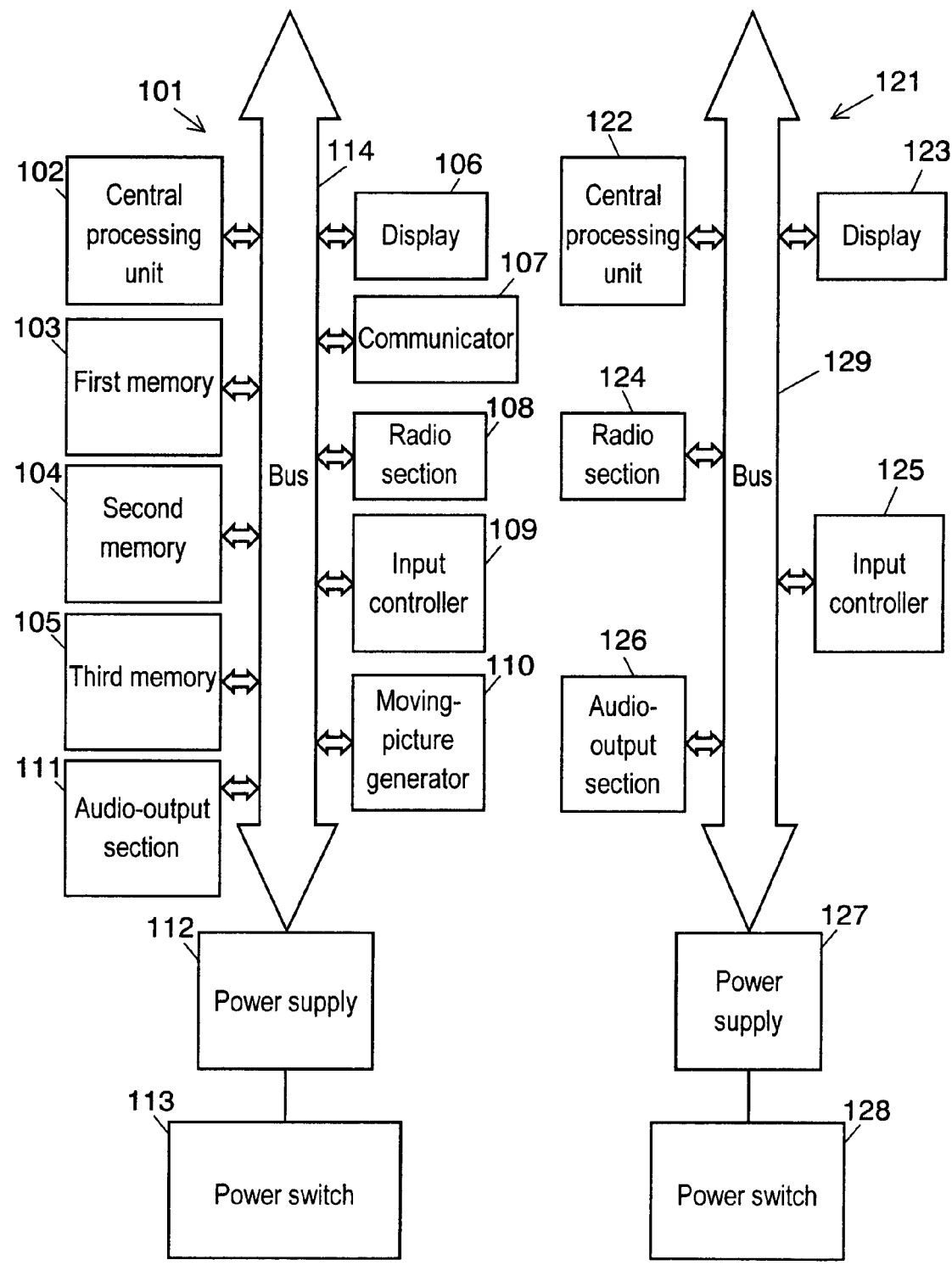
FIG. 12A shows a functional block diagram illustrating a hardware structure of a server of a conventional wireless remote operation system.
FIG. 12B shows a functional block diagram illustrating a hardware structure at the client of the conventional wireless remote operation system.
Figure 13:
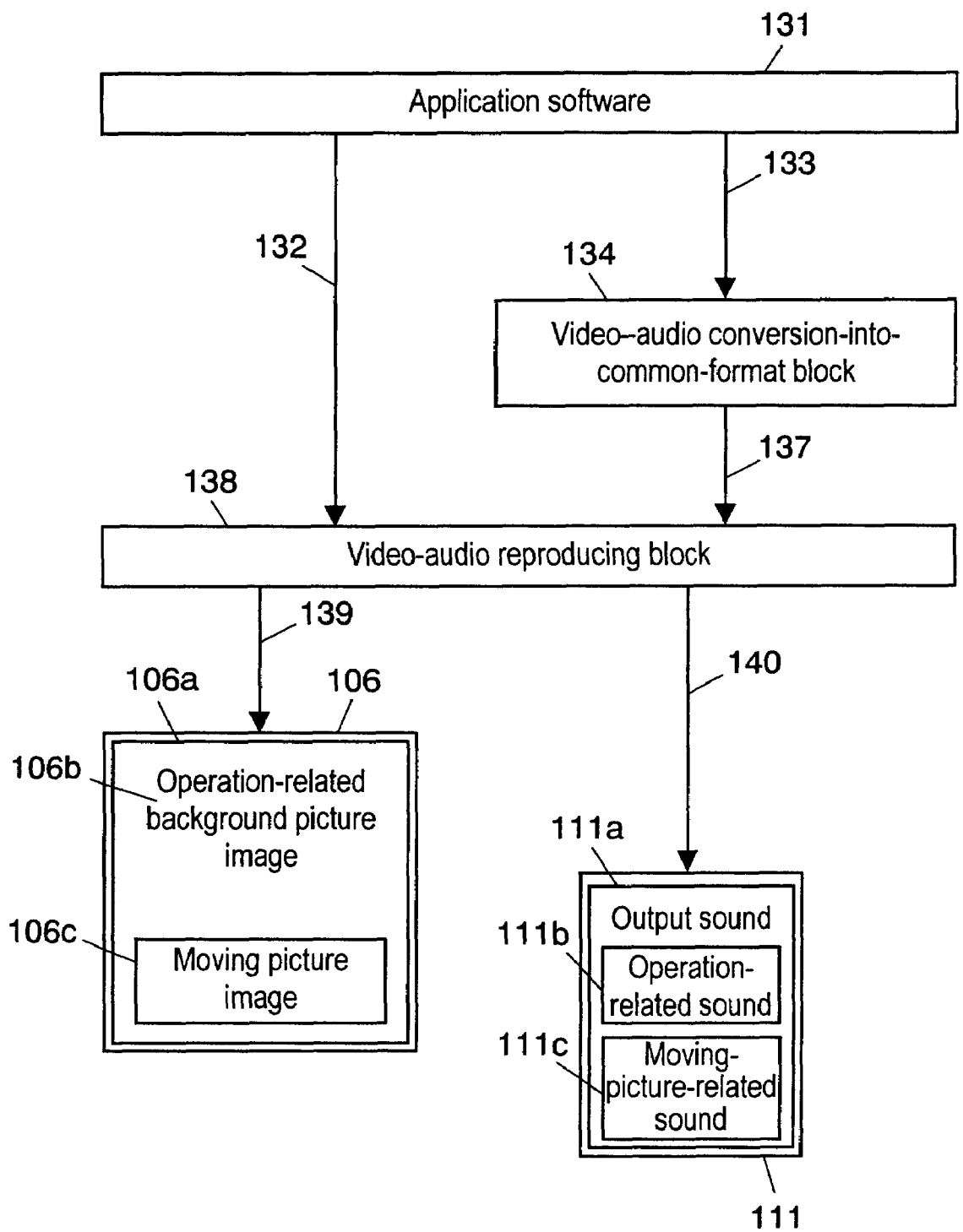
FIG. 13 shows a functional block diagram illustrating a display operation of the server alone in the conventional wireless remote operation system.
Figure 14:
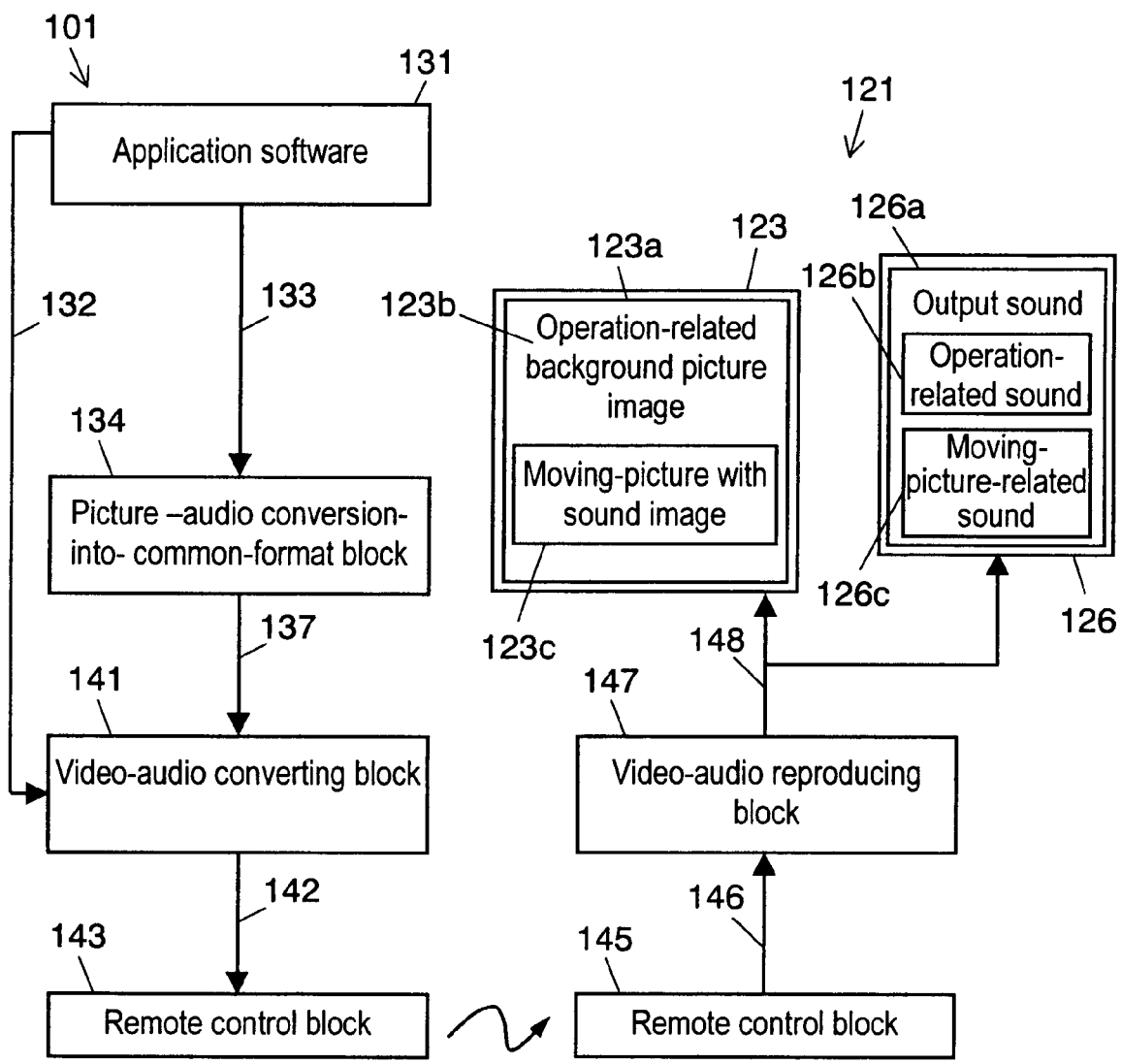
FIG. 14 shows functional block diagram illustrating a remote display operation of the conventional wireless remote operation system.
Figure 15:
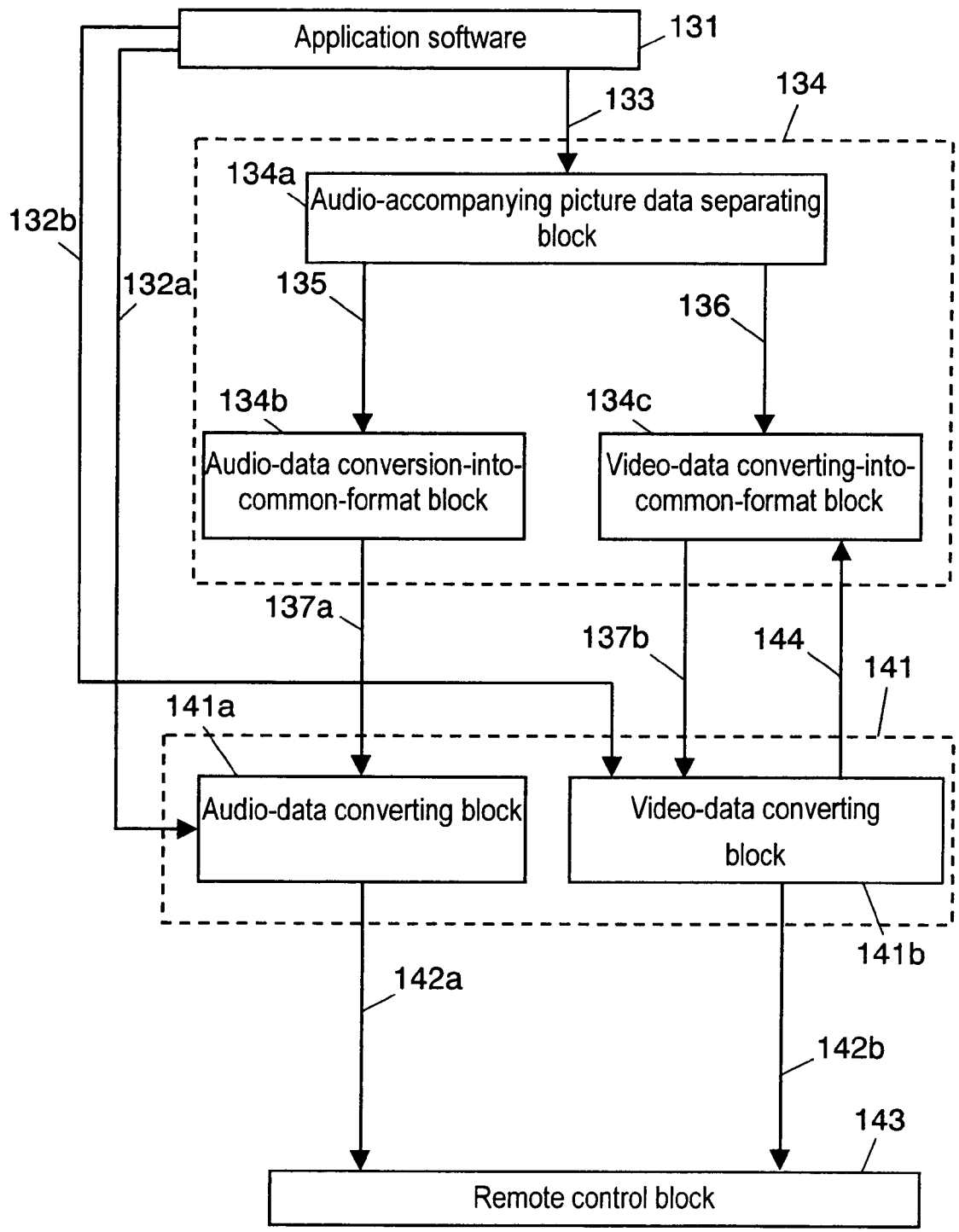
FIG. 15 shows a block diagram detailing an operation of the server in the conventional wireless remote operation system.
Figure 16:
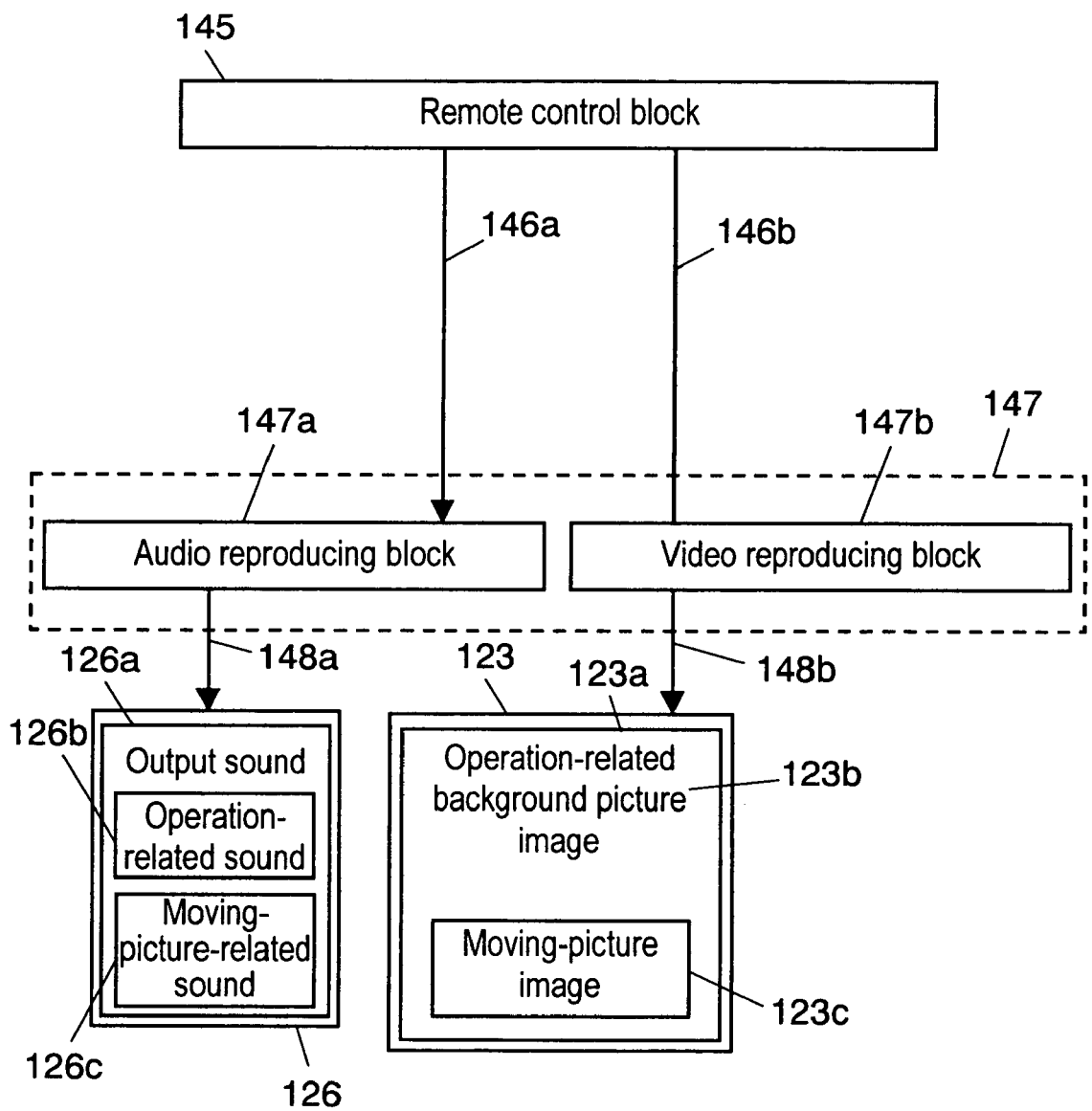
FIG. 16 shows a functional block diagram detailing an operation at the client in the conventional wireless remote operation system.

The second exemplary embodiment of the present invention is demonstrated hereinafter with reference to accompanying drawings. FIG. 7 shows a block diagram illustrating a remote displaying function and a remote operating function of server 1 in accordance with the second embodiment. FIG. 8 shows a block diagram illustrating a remote displaying function and a remote operating function of client 21 in accordance with the second embodiment. FIGS. 9A, 9B detail the remote operating function of server 1. FIG. 10 details a block which processes a transmission of audio-accompanying moving-picture data. FIG. 11 is a block diagram showing a remote displaying function of client 21. The same elements as those already described have the same reference marks and the descriptions thereof are omitted here.

This embodiment refers to the process of various moving-picture data obtained from moving-picture data generator 10 shown in FIG. 1 or from third memory 5 shown in FIG. 1. To be more specific, this embodiment refers to the process of the moving-picture data in the case of using a known compressing method and a known data format.

In FIG. 7, video-audio conversion-into common format block 34x includes a plurality of decoding modules. Conversion block 34x selects a decoding module appropriate to audio-accompanying moving-picture data 33 in a format unique to respective application software supplied from application software 31. The selected module decodes moving-picture data 33 and obtains the audio and video in the original formats predetermined to the respective application software.

The foregoing process is detailed hereinafter. In FIG. 7, converting block 34 further includes branching module 34xd. The case, where compression methods and formats of moving-picture are different in respective application software and are still kept in private, has been previously described using FIGS. 2, 4A, 4B. In such a case, a private decoder and a private converting module corresponding to each application software are supplied from a developing organization or a sales agency of the application software, and those private things are included in converting block 34.

On the other hand, there are some application software of which compression methods and methods of synchronizing audio with video are on public view. Another case is that moving-picture data generator 10 shown in FIG. 1 includes an exclusive moving-picture generator, and its methods of compression and synchronization are obvious. In this case, the decoding module as discussed above is included in converting block 34x.

This second embodiment provides a structure simpler than that described in FIGS. 2 and 4. To be more specific, in the case of FIGS. 2 and 4, respective decoding and converting modules in video-audio conversion-into-common format block 34x decode compressed data, and compress it again in block 52 that processes the transmission of audio-accompanying moving-picture data. However, if the compression method and the data structure are obvious, there is no need to decode and compress the data again, so that the decoding process can be omitted and the simpler and faster process can be realized.

As such, in the case of using a known decoding method, it is not needed to convert the audio and video data into a common format, then to compress the data before transmitting the data to the client, and to decode the compressed data at the client as the way shown FIG. 2 and FIG. 4. In the structure shown in FIG. 7, the data without any modification is transmitted to the client, where the data is decoded.

Branching module 34xd extracts audio-accompany moving-picture data out of audio-accompanying moving-picture data 33 in a unique format, and produces moving-picture area data 62 because module 34xd has a un equivalent to video-audio distributing block 51 shown in FIG. 2. This operation is detailed hereinafter.

Application software 31 outputs data 33 of audio-accompanying moving-picture in a format unique to respective applications to video-audio conversion-into-common-format block 34x, which includes branching module 34xd.

Module 34xd outputs moving-picture area data 62 and audio-accompanying compressed data 63. The way to produce area-data 62 is the same as described about video-audio distributing block 51 shown in FIG. 2. Moving-picture area data 62 is supplied to video-audio converting block 41.

The audio-accompanying moving-picture data is sent to video-audio distributing block 51 as audio-accompanying compressed moving-picture data 63. The decoding method of data 63 is known in advance. Then, data 63 is not processed in video-audio distributing block 51, video-audio synchronizing block 52a, or compressing block 52b, but supplied to multiplexing block 52c as it is. Multiplexing block 52c obtains stream-data 55 of audio-accompanying compressed moving-picture from data 63.

Other operations are similar to those described in FIG. 2. As a result, operation-related display-audio data 56 and stream data 55 of audio-accompanying compressed moving-picture can be transmitted to client 21 from server 1.

An operation of client 21 is described with reference to FIG. 8. At the client, audio-accompanying moving-picture data reproducing processing block 59x includes multiplex-separation bloc 59xa, dedicated decoding block 59xb, and video reproducing block 59xc.

The decoding method of the data is known in advance as described previously. Decoding block 59b shown in FIG. 3 is thus replaced with decoding-only block 59xb, which outputs audio-video data 61 accompanied by the synchronizing data. Based on this synchronizing data, video reproducing block 59xc outputs moving-picture-related video data 50 in YUV format and moving-picture-related audio data 49 in PCM format to display 23 and audio output section 26 respectively with those two data synchronized with each other. The audio-accompanying moving picture is thus reproduced at the place of client 21.

In the foregoing method, data 63 passes through video-audio distributing block 51, synchronizing block 52, and compressing block 52b without stopping off at those blocks in server 1 shown in FIG. 7. Therefore, blocks 52a and 52b can be replaced with dedicated multiplexing block 52c which outputs the data to remote control block 43.

Here is another method.
(1) A predetermined flag is put at the top of data 63 of audio-accompanying compressed moving-picture.
(2) This flag is detected every start-time when data 63 is processed in video-audio distributing block 51, video-audio synchronizing block 52a, and compressing block 52b.
(3) When this flag is detected, the process onward is skipped, and the data including the flag is output from the block.

Here is still another method, i.e., audio-accompanying moving-picture reproducing processing block 59x can be shared in the following way with audio-accompanying moving-picture transmission processing block 52 of the server shown in FIG. 2.
(1) Decoding block 59b and dedicated decoding block 59xb are placed in parallel.
(2) The foregoing process of detecting the flag is done additionally by multiplex-separation block 59xa.
(3) When the flag is detected, the data is supplied to dedicated decoding block 59xb. If this flag is not detected, the data is supplied to decoding block 5%.

Further, when a plurality of decoding methods are known in advance, for instance, various media stored in third memory 5 shown in FIG. 1 have their own decoding methods or the same medium has plural decoding methods, and in the case where moving-picture generator 10 can handle those methods, the following method can be used:

(1) a plurality of flags discussed above are prepared;
(2) when the flag is detected at the data in video-audio synchronizing block 52a and compressing block 52b, the data skips the block;
(3) processing block 59x has a plurality of decoding blocks; and
(4) a block, which determines which decoding block should be selected from the plural flags, is added after multiplex-separation block 59xa.

FIG. 9 through FIG. 11 describe FIGS. 7 and 8 more specifically. FIGS. 9A and 9B describe server 1 in detail, in particular, video-audio conversion-into-common-format block 34x. FIG. 10 details the block which exclusively processes the audio-accompanying data. FIG. 11 details client 21.

The process of analog data of moving-picture received by a television tuner is described hereinafter with reference to FIGS. 9A and 9B. Moving-picture data generator 10 shown in FIG. 1 converts the analog data into digital data of the moving-picture. This digital data is compressed by a given compressing method in advance into compressed moving-picture data (referred to as compressed data in TV format) of which decompressed video is supposed to display on a television (TV) screen.

This digital data is controlled by the application software and sent to branching module 34xd, which obtains compressed audio-data 63a in TV format and compressed video data 63b in TV format. Those data have been processed with the synchronizing data so that they can be synchronized with each other at reproducing. As already described in FIG. 7, the data passes through video-audio distributing block 51 without stopping there and are fed into block 52 that processes the transmission of the audio-accompanying moving-picture. Branching module 34xd outputs also moving-picture area data 62 in RGB format as described with reference to FIGS. 2 and 7.

Blocks 41y, 41ya, 41yb, and 43y shown in FIG. 9B perform the same processes as blocks 41, 41a, 41b, and 43 in FIG. 4 respectively. FIG. 10 describes block 52 that processes the transmission of the data of audio-accompanying moving-picture. In FIG. 10, compressed audio data 63a in TV format and compressed video data 63b in TV format pass through video-audio synchronizing block 52a and compressing block 52b without stopping there, and enter into multiplexing block 52c.

At client 21 shown in FIG. 11, demultiplex block 59xa receive compressed audio data 60a in TV format and compressed video data 60b in TV format, those data are the same as data 63a, 63b shown in FIG. 9A.

Decoding block 59xb dedicated for TV obtains moving-picture-related audio data 61a in PCM format accompanied by the synchronizing data and moving-picture-related video data 61b in YUV format accompanied by the synchronizing data using a predetermined decoding method. As a result, the data of audio-accompanying moving-picture received by the TV tuner in the server can be reproduced at the client.

As discussed above, the compression method, the method of synchronizing audio with video, and the data structure of the audio-accompanying moving-picture data are disclosed in advance. Then the simpler method as described with reference to FIG. 7 through FIG. 11 can be used, i.e., the foregoing method is simpler than the method described in the first embodiment.

Addition of branching module 34xd to video-audio conversion-into-common-format block 34 shown in FIG. 2 and FIG. 4A allows the following process: Various wide-area networks or various media used in the third memory, or the system-only moving-picture generator produces various moving-picture data broadcasting media such as a TV program. Those various moving-picture data can be handled at a higher speed and in a simpler manner. This method allows a server having a lower process capability to process those data.

The present invention can be used regardless of the moving-picture data format being in public or in private. Therefore, the mechanism of the system can maintain consistency, and the software that handles moving-picture data can be developed in more simple manner. When a system trouble occurs, the maintenance can be done with ease.

The mechanism of the present invention can be used for handling virgin data not compressed or processed (e.g., music data). This is detailed as follows: The virgin data not compressed or processed can be transmitted as it is to the client from the server, and the client does not need to decompress the data.

In the previous embodiments, one client corresponds to one server; however, a plurality of clients can respond to one server. The server can includes a plurality of application software, therefore, the plurality of clients can independently control the plurality of application software of the server.

In the previous embodiments, the wireless remote operation system is described; however, since the operation is realized by a wireless system, a cable system having a wider transmission bandwidth can adopt this technique without any problem.

The wireless remote operation system of the present invention, as discussed previously, can separate background data and operation-related audio data from the audio-accompanying moving-picture data, and specify a transmission format. Those preparations can suppress data amount to be transmitted, thereby lightening the load applied to the transmission bandwidth. As a result, the client can draw the picture smoothly.

Further, the synchronizing stamp is inserted into the data of audio-accompanying moving-picture for synchronizing the audio data with the video data before transmission to the client. This preparation allows the client to refer to the synchronizing stamp for synchronization before reproducing the moving picture, so that out of sync. between sound and picture can be prevented.

The operations of respective blocks described in the first and second embodiments can be carried out by software, or units of hardware. Some of the operations of respective blocks described in the first and second embodiments can be carried out by software, and others can be carried out by units of hardware. They can be also carried out by a combination of software and hardware.

What is claimed is:
1. A remote operation system comprising:
   (a) a server for handling application software, said server including:
      (a-1) a data conversion block for converting audio-accompanying moving-picture data, having a format unique to the application software and supplied from the application software, into formatted video-audio data in a common format within the system;
      (a-2) a video-audio distributing block for receiving the formatted video-audio data and outputting 1) moving-picture area data and 2) audio-accompanying video data, said moving-picture area data including a given data corresponding to a moving-picture portion of the audio-accompanying video data;

(a-3) a transmission processing block for 1) adding synchronizing data to the audio-accompanying video data received from the video-audio distributing block to synchronize audio with video and 2) compressing the audio-accompanying video data including said synchronizing data into a data stream, said transmission processing block outputting the data stream;

(a-4) a video-audio converting block for adding the moving-picture area data to operation-related audio-display data supplied from the application software to form operation data for remote operation;

(a-5) a first remote control block for receiving the operation data and the data stream, and separately outputting the operation data and the data stream; and (b) a client for receiving the operation and the data stream from said server, the client reproducing the video and the audio from the received data stream, and independently controlling the application software in response to an operation related to the video and the audio using the received operation data.

2. The remote operation system of claim 1, wherein said client includes:

(b-1) a second control block for receiving the operation data and the data stream from said first remote control block, and outputting the operation-data, and the data stream; and (b-2) a reproducing processing block for receiving the data stream, decoding the data stream, and synchronizing the video with the audio thereof, and outputting the video and the audio.

3. The remote operation system of claim 1, wherein said transmission processing block includes:

a video-audio synchronizing block for dividing each of the video and the audio into given units, and for obtaining audio data accompanied by the synchronizing data and video data accompanied by the synchronizing data, where numeric data is inserted for synchronizing the video with the audio between the video and the audio divided into the given units;

a compressing block for compressing the audio data accompanied by the synchronizing data and the video data accompanied by the synchronizing data respectively, and outputting the compressed audio data and the compressed video data; and a multiplexing block for putting the compressed audio data and the compressed video data into the data stream on a given unit-by-unit basis, and outputting the data stream.

4. The remote operation system of claim 2, wherein said transmission processing block includes:

a video-audio synchronizing block for dividing each of the video and the audio into given units, and for obtaining audio data accompanied by the synchronizing data and video data accompanied by the synchronizing data, where numeric data is inserted for synchronizing the video with the audio between the video and the audio divided into the given units;

a compressing block for compressing the audio data accompanied by the synchronizing data and the video data accompanied by the synchronizing data respectively, and outputting the compressed audio data and the compressed video data; and a multiplexing block for putting the compressed audio data and the compressed video data into the data stream on a given unit-by-unit basis, and outputting the data stream.

5. The remote operation system of claim 4, wherein said reproducing processing block includes:

a demultiplex block for receiving the data stream from said second remote control block, and demultiplexing the data stream into the compressed audio data and the compressed video data;

a decoding block for receiving the compressed audio data and the compressed video data, and decoding those data respectively into the audio data accompanied by the synchronizing data and the video data accompanied the by synchronizing data; and a video-audio reproducing block for synchronizing the audio data with moving picture data which are respectively included in the audio data accompanied by the synchronizing data and the video data accompanied by the synchronizing data, and reproducing the audio data and the moving picture data.

6. The remote operation system of claim 5, wherein said data conversion block includes a branching module, wherein, when the audio-accompanying moving-picture data having the unique format follows a predetermined compression method, said branching module outputs the audio-accompanying moving-picture data having the unique format to said multiplexing block as audio-accompanying compressed moving-picture data, and outputs the moving-picture area data to said video-audio converting block, wherein said multiplexing block outputs the data stream; and wherein said decoding block decodes the audio-accompanying compressed moving-picture data by a decoding method corresponding to the predetermined compression method.

7. The remote operation system of claim 1, wherein the video data is compressed by MPEG in said transmission processing block.

8. The remote operation system of claim 2, wherein the video data is compressed by MPEG in said transmission processing block.

9. The remote operation system of claim 3, wherein the video data is compressed by MPEG in said compressing block.

10. The remote operation system of claim 4, wherein the video data is compressed by MPEG in said compressing block.

11. The remote operation system of claim 1, wherein said moving-picture area data includes data specifying a location of said moving-picture portion in said audio-accompanying video data.

12. The remote operation system of claim 11, wherein said moving-picture area data further includes data specifying a size of said moving-picture portion in said audio-accompanying video data.

13. The remote operation system of claim 11, wherein said moving-picture area data further includes data specifying a color indicating said moving-picture portion in said audio-accompanying video data.

14. The remote operation system of claim 1, wherein the moving-picture area data includes video data in an RGB format, and video data of the audio-accompanying video data is in a YUV format.

15. The remote operation system of claim 2, wherein the video data of the audio-accompanying video data is compressed by MPEG.

16. The remote operation system of claim 5, wherein the video data is compressed by MPEG.

* * * * *

UNITED STATES PATENT AND TRADEMARK OFFICE
CERTIFICATE OF CORRECTION

| | | |
|---|---|---|
| PATENT NO. | : 7,245,665 B2 | Page 1 of 1 |
| APPLICATION NO. | : 10/446403 | |
| DATED | : July 17, 2007 | |
| INVENTOR(S) | : Dai Ueda et al. | |

It is certified that error appears in the above-identified patent and that said Letters Patent is hereby corrected as shown below:

<u>Column 17</u>
Line 17, after "operation" add -- data --

Signed and Sealed this

Eighteenth Day of December, 2007

JON W. DUDAS
*Director of the United States Patent and Trademark Office*